United States Patent
Andersson et al.

(10) Patent No.: US 12,382,032 B2
(45) Date of Patent: Aug. 5, 2025

(54) EXTRA-LONG TAP DEBLOCKING

(71) Applicant: Telefonaktiebolaget LM Ericsson (publ), Stockholm (SE)

(72) Inventors: Kenneth Andersson, Gävle (SE); Jack Enhorn, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 114 days.

(21) Appl. No.: 18/553,356

(22) PCT Filed: Mar. 30, 2022

(86) PCT No.: PCT/EP2022/058406
§ 371 (c)(1),
(2) Date: Sep. 29, 2023

(87) PCT Pub. No.: WO2022/207701
PCT Pub. Date: Oct. 6, 2022

(65) Prior Publication Data
US 2024/0195962 A1    Jun. 13, 2024

Related U.S. Application Data

(60) Provisional application No. 63/168,572, filed on Mar. 31, 2021.

(51) Int. Cl.
*H04N 19/117* (2014.01)
*H04N 19/176* (2014.01)
*H04N 19/82* (2014.01)

(52) U.S. Cl.
CPC ......... *H04N 19/117* (2014.11); *H04N 19/176* (2014.11); *H04N 19/82* (2014.11)

(58) Field of Classification Search
CPC ..... H04N 19/117; H04N 19/176; H04N 19/82
(Continued)

(56) References Cited

U.S. PATENT DOCUMENTS

| | | |
|---|---|---|
| 2019/0306503 A1 | 10/2019 | Dong et al. |
| 2019/0379913 A1* | 12/2019 | Sun ...................... H04N 19/117 |
| 2021/0297684 A1* | 9/2021 | Park ...................... H04N 19/159 |

FOREIGN PATENT DOCUMENTS

| | | |
|---|---|---|
| EP | 2 728 870 A1 | 5/2014 |
| WO | 2019/137751 A1 | 7/2019 |

(Continued)

OTHER PUBLICATIONS

International Search Report and Written Opinion issued in International Application No. PCT/EP2022/058406 dated Jul. 21, 2022 (15 pages).

(Continued)

*Primary Examiner* — Allen C Wong
(74) *Attorney, Agent, or Firm* — Rothwell, Figg, Ernst & Manbeck, P.C.

(57) ABSTRACT

A method for deblocking is provided. The method includes checking whether a size of a current block exceeds a size threshold. The method includes checking whether a size of an adjacent block exceeds the size threshold. The adjacent block is adjacent to a boundary of the current block. The method includes determining that a criteria is true. The criteria comprises both a size of the current block and a size of the adjacent block exceeding the size threshold. The method includes, as a result of determining that the criteria is true, applying a long-tap deblocking across the boundary of the current block. A length of the long-tap deblocking is greater than 7.

20 Claims, 7 Drawing Sheets

(58) Field of Classification Search
USPC .................................................. 375/240.02
See application file for complete search history.

(56) References Cited

FOREIGN PATENT DOCUMENTS

WO   2021/043165 A1   3/2021
WO   2022/207701 A1   10/2022

OTHER PUBLICATIONS

International Search Report and Written Opinion issued in International Application No. PCT/EP2023/061006 dated Jun. 19, 2023 (14 pages).

L. Zhang et al., "Description of Core Experiment 2 (CE2) on In-Loop Filters", Joint Video Experts Team (JVET) of ITU-T SG 16 WP 3 and ISO/IEC JTC 1/SC 29/WG 11, Document: JVET-J1022_r2, 10th Meeting: San Diego, US, Apr. 10-20, 2018 (30 pages).

B. Bross, "General Video Coding Technology in Responses to the Joint Call for Proposals on Video Compression With Capability Beyond HEVC", IEEE Transactions on Circuits and Systems for Video Technology, vol. 30, No. 5, May 2020 (15 pages).

M. Ikeda et al., "CE2: Long-tap deblocking filter for luma and chroma (CE2-2.1.6)", Joint Video Experts Team (JVET) of ITU-T SG 16 WP 3 and ISO/IEC JTC 1/SC 29/WG 11, Document: JVET-K0152-v1, 11th Meeting: Ljubljana, SI, Jul. 10-18, 2018 (10 pages).

M. Karczewicz et al., "VVC In-Loop Filters", IEEE Transactions on Circuits and Systems for Video Technology, vol. 31, No. 10, Oct. 2021 (19 pages).

K. Andersson et al., "Non-EE2: Longer deblocking filter for luma", Joint Video Experts Team (JVET) of ITU-T SG 16 WP 3 and ISO/IEC JTC 1/SC 29, Document: JVET-AA0139-v1, 27th Meeting, by teleconference, Jul. 13-22, 2022 (4 pages).

ITU-T Telecommunication Standardization Sector of ITU, H.266, "Series H: Audiovisual and Multimedia Systems", Infrastructure of audiovisual services—Coding of moving video, Versatile video coding, Aug. 2020 (516 pages).

\* cited by examiner

EXTRA-LONG TAP DEBLOCKING

CROSS REFERENCE TO RELATED APPLICATIONS

This application is a 35 U.S.C. § 371 National Stage of International Patent Application No. PCT/EP2022/058406, filed Mar. 30, 2022, which claims priority to U.S. provisional patent application No. 63/168,572, filed Mar. 31, 2021, which is incorporated by this reference.

TECHNICAL FIELD

This disclosure relates to coding and decoding of video sequences and/or still images, and more particularly, to extra-long tap deblocking.

BACKGROUND

A video sequence has one or more images (also referred to herein as "pictures"). When viewed on a screen, the image consists of pixels, each pixel typically having a red, green and blue (RGB) value. However, when encoding and decoding a video sequence, the image is often not represented using RGB but typically using another color space, including but not limited to YCbCr, ICTCP, non-constant-luminance YCbCr, and constant luminance YCbCr. If one takes the example of non-constant luminance YCbCr, which is currently the most used representation, it is made up of three components, Y, Cb and Cr. It is often the case that Y, which is called luma and which roughly represents luminance, is of full resolution, whereas the two other components, Cb and Cr, called chroma, are of a smaller resolution. A typical example is a high definition (HD) video sequence containing 1920×1080 RGB pixels, which is often represented by a 1920×1080-resolution Y component, a 960×540 Cb component and a 960×540 Cr component. The elements in the components are called samples. In the example given above, there are therefore 1920×1080 samples in the Y component, and hence a direct relationship between samples and pixels. Therefore, in this document, the term pixels and samples can be used interchangeably. For the Cb and Cr components, there is no direct relationship between samples and pixels; a single Cb sample typically influences several pixels.

In the Versatile Video Coding standard (VVC) that is developed by the Joint Video Experts Team (JVET) (also referred to herein as the "VVC"), the decoding of an image is carried out in two stages; prediction coding and loop filtering. In the prediction decoding stage, the samples of the components (Y, Cb and Cr) are partitioned into rectangular blocks. As an example, one block may be of size 4×8 samples, whereas another block may be of size 64×64 samples. The decoder obtains instructions for how to obtain a prediction for each block, for instance to copy samples from a previously decoded image (an example of temporal prediction) or copy samples from already decoded parts of the current image (an example of intra prediction), or a combination thereof. To improve this prediction, the decoder may obtain a residual, often encoded using transform coding such as discrete sine or cosine transform (DST or DCT). Transforms are extensively used to remove spatial redundancy from the prediction error from intra picture and inter picture prediction in video coding. The transform sizes have increased with the progression of video coding standards. In H.264 the maximum transform size was 16×16, in HEVC the maximum transform size was 32×32 and in VVC, the latest MPEG/ITU video coding standard, the maximum transform size is 64×64. In VVC also a secondary low frequency non-separable transform (LFNST) can be applied after the separable DCT/DST based transform. In work beyond version 1 of VVC it has been shown that increase of transform size can provide further gains in coding efficiency. This residual is added to the prediction, and the decoder can proceed to decode the next block.

The output from the prediction decoding stage is the three components Y, Cb, and Cr. However, it is possible to further improve the fidelity of these components, and this is done in the loop filtering stage. The loop filtering stage in VVC consists of three sub-stages; a deblocking filter stage, a sample adaptive offset (SAO) filter sub-stage, and an adaptive loop filter (ALF) sub-stage. In the deblocking filter sub-stage, the decoder changes Y, Cb, and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to samples that meet certain conditions, such as being in a certain value range (band offset SAO) or having a specific neighborhood (edge offset SAO). This can reduce ringing noise since such noise often aggregate in a certain value range or in specific neighborhoods (e.g., in local maxima). The reconstructed image component that are the result of this stage are denoted YSAO, CbSAO, CrSAO.

A well performing block-based video coding standard may make use of deblocking filtering. To handle the increase of transform size, the deblocking filter lengths were extended in VVC compared to HEVC. Here follows a description of deblocking in VVC.

In VVC, the deblocking is applied on an 4×4 grid for CUs first on vertical boundaries (CU/implicit TU/prediction sub-block boundaries) and then on horizontal boundaries (CU/implicit TU/prediction sub-block boundaries). Prediction sub-block boundaries inside a CU are filtered on an 8×8 grid. The deblocking is based on HEVC deblocking, but also has longer deblocking filters if the size orthogonal to the block boundary is equal to or larger than 32 on at least one side for luma and the other side is larger than 4, modifying at most 7 samples (reading at most 8 samples), if the size orthogonal to the block boundary is less than 32 for one side for luma it modifies at most 3 samples and reading at most 4 samples on that side, and if it is equal to or larger than 8 on both side of a boundary in chroma samples for chroma modifying at most 3 chroma samples and reading at most 4 chroma samples otherwise it modifies at most one sample and reading at most two samples on respective side of the boundary.

The deblocking edge decisions are computed for line 0 and line 3 for a 4 sample segment of the block boundary. Based on the deblocking edge decision either long deblocking filter, strong deblocking filter, or weak deblocking filter is applied for filtering lines 0 to 3 of the sample segment of the block boundary.

The following is an excerpt from VVC. This excerpt describes the decision process for luma block edges.

8.8.3.6.2 Decision Process for Luma Block Edges

[The] Inputs to this process are:
a picture sample array recPicture,
a location (xCb, yCb) specifying the top-left sample of the current coding block relative to the top-left sample of the current picture,
a location (xBl, yBl) specifying the top-left sample of the current block relative to the top-left sample of the current coding block, a variable edgeType specifying whether a vertical (EDGE_VER) or a horizontal (EDGE_HOR) edge is filtered, a variable bS specifying the boundary filtering strength, a variable maxFilterLengthP specifying the maximum filter length, a variable maxFilterLengthQ specifying the maximum filter length.

[The] Outputs of this process are:

the variables dE, dEp and dEq containing decisions, the modified filter length variables maxFilterLengthP and maxFilterLengthQ, the variable $t_C$.

The sample values $p_{i,k}$ and $q_{j,k}$ with i=0 . . . Max(2, maxFilterLengthP), j=0 . . . Max(2, maxFilterLengthQ) and k=0 and 3 are derived as follows:

If edgeType is equal to EDGE_VER, the following applies:

$$q_{j,k} = recPicture[xCb+xBl+j][yCb+yBl+k] \quad (1256)$$

$$p_{i,k} = recPicture[xCb+xBl-i-1][yCb+yBl+k] \quad (1257)$$

Otherwise (edgeType is equal to EDGE_HOR), the following applies:

$$q_{j,k} = recPicture[xCb+xBl+k][yCb+yBl+j] \quad (1258)$$

$$p_{i,k} = recPicture[xCb+xBl+k][yCb+yBl-i-1] \quad (1259)$$

The variable qpOffset is derived as follows:

If sps_ladf_enabled_flag is equal to 1, the following applies:

The variable lumaLevel of the reconstructed luma level is derived as follow:

$$\text{lumaLevel} = ((p_{0,0}+p_{0,3}+q_{0,0}+q_{0,3}) \gg 2), \quad (1260)$$

The variable qpOffset is set equal to sps_ladf_lowest_interval_qp_offset and modified as follows:

```
for( i = 0; i < sps_num_ladf_intervals_minus2 + 1; i++ ) {
  if( lumaLevel > SpsLadfIntervalLowerBound[ i + 1 ] )
    qpOffset = sps_ladf_qp_offset[ i ] (1261)
  else
    break
}
```

Otherwise, qpOffset is set equal to 0.

The variables $Qp_Q$ and $Qp_P$ are set equal to the $Qp_Y$ values of the coding units which include the coding blocks containing the sample $q_{0,0}$ and $p_{0,0}$, respectively.

The variable qP is derived as follows:

$$qP = ((Qp_Q + Qp_P + 1) \gg 1) + qpOffset \quad (1262)$$

The value of the variable β' is determined as specified in Table 43 based on the quantization parameter Q derived as follows:

$$Q = \text{Clip3}(0, 63, qP + (\text{slice\_beta\_offset\_div2} \ll 1)) \quad (1263)$$

where slice_beta_offset_div2 is the value of the syntax element slice_beta_offset_div2 for the slice that contains sample $q_{0,0}$.

The variable R is derived as follows:

$$\beta = \beta' * (1(\text{BitDepth}-8)) \quad (1264)$$

The value of the variable $t_C'$ is determined as specified in Table 43 based on the quantization parameter Q derived as follows:

$$Q = \text{Clip3}(0, 65, qP + 2*(bS-1) + (\text{slice\_tc\_offset\_div2} \ll 1)) \quad (1265)$$

where slice_tc_offset_div2 is the value of the syntax element slice_tc_offset_div2 for the slice that contains sample $q_{0,0}$.

The variable $t_C$ is derived as follows:

If BitDepth is less than 10, the following applies:

$$t_C = (t_C' + (1 \ll (9-\text{BitDepth}))) \gg (10-\text{BitDepth}) \quad (1266)$$

Otherwise (BitDepth is greater than or equal to 10), the following applies:

$$t_C = \text{BitDepth} < 10 ? (t_C'+2) \gg (10-\text{BitDepth}) : t_C' * (1 \ll (\text{BitDepth}-10)) \quad (1267)$$

The following ordered steps apply:

1. The variables dp0, dp3, dq0 and dq3 are derived as follows:

$$dp0 = \text{Abs}(p_{2,0} - 2*p_{1,0} + p_{0,0}) \quad (1268)$$

$$dp3 = \text{Abs}(p_{2,3} - 2*p_{1,3} + p_{0,3}) \quad (1269)$$

$$dq0 = \text{Abs}(q_{2,0} - 2*q_{1,0} + q_{0,0}) \quad (1270)$$

$$dq3 = \text{Abs}(q_{2,3} - 2*q_{1,3} + q_{0,3}) \quad (1271)$$

2. When maxFilterLengthP and maxFilterLengthQ both are equal to or greater than 3 the variables sp0, sq0, spq0, sp3, sq3 and spq3 are derived as follows:

$$sp0 = \text{Abs}(p_{3,0} - p_{0,0}) \quad (1272)$$

$$sq0 = \text{Abs}(q_{0,0} - q_{3,0}) \quad (1273)$$

$$spq0 = \text{Abs}(p_{0,0} - q_{0,0}) \quad (1274)$$

$$sp3 = \text{Abs}(p_{3,3} - p_{0,3}) \quad (1275)$$

$$sq3 = \text{Abs}(q_{0,3} - q_{3,3}) \quad (1276)$$

$$spq3 = \text{Abs}(p_{0,3} - q_{0,3}) \quad (1277)$$

3. The variables sidePisLargeBlk and sideQisLargeBlk are set equal to 0.
4. When maxFilterLengthP is greater than 3, sidePisLargeBlk is set equal to 1.
5. When maxFilterLengthQ is greater than 3, sideQisLargeBlk is set equal to 1.
6. When edgeType is equal to EDGE_HOR and (yCb+yBl) % CtbSizeY is equal to 0, sidePisLargeBlk is set equal to 0.
7. The variables dSam0 and dSam3 are initialized to 0.
8. When sidePisLargeBlk or sideQisLargeBlk is greater than 0, the following applies:
    a. The variables dp0L, dp3L are derived and maxFilterLengthP is modified as follows:
If sidePisLargeBlk is equal to 1, the following applies:

$$dp0L = (dp0 + \text{Abs}(p_{5,0} - 2*p_{4,0} + p_{3,0}) + 1) \gg 1 \quad (1278)$$

$$dp3L = (dp3 + \text{Abs}(p_{5,3} - 2*p_{4,3} + p_{3,3}) + 1) \gg 1 \quad (1279)$$

Otherwise, the following applies:

$$dp0L = dp0 \quad (1280)$$

$$dp3L = dp3 \quad (1281)$$

$$\text{maxFilterLengthP} = 3 \quad (1282)$$

b. The variables dq0L and dq3L are derived as follows:
If sideQisLargeBlk is equal to 1, the following applies:

$$dq0L = (dq0 + \text{Abs}(q_{5,0} - 2*q_{4,0} + q_{3,0}) + 1) \gg 1 \quad (1283)$$

$$dq3L = (dq3 + \text{Abs}(q_{5,3} - 2*q_{4,3} + q_{3,3}) + 1) \gg 1 \quad (1284)$$

Otherwise, the following applies:

$$dq0L=dq0 \quad (1285)$$

$$dq3L=dq3 \quad (1286)$$

c. The variables sp0L and sp3L are derived as follows:
If maxFilterLengthP is equal to 7, the following applies:

$$sp0L=sp0+Abs(p_{7,0}-p_{6,0}-p_{5,0}+p_{4,0}) \quad (1287)$$

$$sp3L=sp3+Abs(p_{7,3}-p_{6,3}-p_{5,3}+p_{4,3}) \quad (1288)$$

Otherwise, the following applies:

$$sp0L=sp0 \quad (1289)$$

$$sp3L=sp3 \quad (1290)$$

d. The variables sq0L and sq3L are derived as follows:
If maxFilterLengthQ is equal to 7, the following applies:

$$sq0L=sq0+Abs(q_{4,0}-q_{5,0}-q_{6,0}+q_{7,0}) \quad (1291)$$

$$sq3L=sq3+Abs(q_{4,3}-q_{5,3}-q_{6,3}+q_{7,3}) \quad (1292)$$

Otherwise, the following applies:

$$sq0L=sq0 \quad (1293)$$

$$sq3L=sq3 \quad (1294)$$

e. The variables dpq0L, dpq3L, and dL are derived as follows:

$$dpq0L=dp0L+dq0L \quad (1295)$$

$$dpq3L=dp3L+dq3L \quad (1296)$$

$$dL=dpq0L+dpq3L \quad (1297)$$

f. When dL is less than β, the following ordered steps apply:
 i. The variable dpq is set equal to 2*dpq0L.
 ii. The variable sp is set equal to sp0L, the variable sq is set equal to sq0L and the variable spq is set equal to spq0.
 iii. The variables $p_0$ $p_3$ $q_o$ and $q_3$ are first initialized to 0 and then modified according to sidePisLargeBlk and sideQisLargeBlk as follows:
When sidePisLargeBlk is equal to 1, the following applies:

$$p_3=p_{3,0} \quad (1298)$$

$$p_0=p_{maxFilterLengthP,0} \quad (1299)$$

When sideQisLargeBlk is equal to 1, the following applies:

$$q_3=q_{3,0} \quad (1300)$$

$$q_0=q_{maxFilterLengthQ,0} \quad (1301)$$

iv. For the sample location (xCb+xBl, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam0.
 v. The variable dpq is set equal to 2*dpq3L.
 vi. The variable sp is set equal to sp3L, the variable sq is set equal to sq3L and the variable spq is set equal to spq3.
 vii. The variables $p_0$ $p_3$ $q_0$ and $q_3$ are first initialized to 0 and are then modified according to sidePisLargeBlk and sideQisLargeBlk as follows:

When sidePisLargeBlk is equal to 1, the following applies:

$$p_3=p_{3,3} \quad (1302)$$

$$p_0=p_{maxFilterLengthP,3} \quad (1303)$$

When sideQisLargeBlk is equal to 1, the following applies:

$$q_3=q_{3,3} \quad (1304)$$

$$q_0=q_{maxFilterLengthQ,3} \quad (1305)$$

viii. When edgeType is equal to EDGE_VER for the sample location (xCb+xBl, yCb+yBl+3) or when edgeType is equal to EDGE_HOR for the sample location (xCb+xBl+3, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam3.

9. The variables dE, dEp and dEq are derived as follows:
If dSam0 and dSam3 are both equal to 1, the variable dE is set equal to 3, dEp is set equal to 1, and dEq is set equal to 1.
Otherwise, the following ordered steps apply:
a. The variables dpq0, dpq3, dp, dq and d are derived as follows:

$$dpq0=dp0+dq0 \quad (1306)$$

$$dpq3=dp3+dq3 \quad (1307)$$

$$dp=dp0+dp3 \quad (1308)$$

$$dq=dq0+dq3 \quad (1309)$$

$$d=dpq0+dpq3 \quad (1310)$$

b. The variables dE, dEp, dEq, sidePisLargeBlk and sideQisLargeBlk are set equal to 0.
c. When d is less than β and both maxFilterLengthP and maxFilterLengthQ are greater than 2, the following ordered steps apply:
 i. The variable dpq is set equal to 2*dpq0.
 ii. The variable sp is set equal to sp0, the variable sq is set equal to sq0 and the variable spq is set equal to spq0.
 iii. For the sample location (xCb+xBl, yCb+yBl), the decision process for a luma sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_C$ as inputs, and the output is assigned to the decision dSam0.
 iv. The variable dpq is set equal to 2*dpq3.
 v. The variable sp is set equal to sp3, the variable sq is set equal to sq3 and the variable spq is set equal to spq3.
 vi. When edgeType is equal to EDGE_VER for the sample location (xCb+xBl, yCb+yBl+3) or when edgeType is equal to EDGE_HOR for the sample location (xCb+xBl+3, yCb+yBl), the decision process for a sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, 3 and $t_C$ as inputs, and the output is assigned to the decision dSam3.

d. When d is less than β, the following ordered steps apply:
i. The variable dE is set equal to 1.
ii. When dSam0 is equal to 1 and dSam3 is equal to 1, the variable dE is set equal to 2 and both maxFilterLengthP and maxFilterLengthQ are set equal to 3.
iii. When maxFilterLengthP is greater than 1, and maxFilterLengthQ is greater than 1, and dp is less than $(β+(β\gg1))\gg3$, the variable dEp is set equal to 1.
iv. When maxFilterLengthP is greater than 1, and maxFilterLengthQ is greater than 1, and dq is less than $(β+(β\gg1))\gg3$, the variable dEq is set equal to 1.
v. When dE is equal to 1, maxFilterLengthP is set equal to 1+dEp and maxFilterLengthQ is set equal to 1+dEq.

The following is another excerpt from VVC. This excerpt describes the filtering process for luma block edges:

8.8.3.6.3 Filtering Process for Luma Block Edges

[The] Inputs to this process are:
a picture sample array recPicture,
a location (xCb, yCb) specifying the top-left sample of the current coding block relative to the top-left sample of the current picture,
a location (xBl, yBl) specifying the top-left sample of the current block relative to the top-left sample of the current coding block,
a variable edgeType specifying whether a vertical (EDGE_VER) or a horizontal (EDGE_HOR) edge is filtered,
the variables dE, dEp and dEq containing decisions,
the variables maxFilterLengthP and maxFilterLengthQ containing maximum filter lengths,
the variable $t_C$.

[The] Output of this process is the modified picture sample array recPicture.

Depending on the value of edgeType, the following applies:

If edgeType is equal to EDGE_VER, the following ordered steps apply:
1. The sample values $p_{i,k}$ and $q_{j,k}$ with i=0 . . . maxFilterLengthP, j=0 . . . maxFilterLengthQ and k=0 . . . 3 are derived as follows:

$$q_{j,k} = recPicture[xCb+xBl+j][yCb+yBl+k] \quad (1311)$$

$$p_{i,k} = recPicture[xCb+xBl-i-1][yCb+yBl+k] \quad (1312)$$

2. When dE is not equal to 0 and dE is not equal to 3, for each sample location (xCb+xBl, yCb+yBl+k), k=0 . . . 3, the following ordered steps apply:
The filtering process for a luma sample using short filters as specified in clause 8.8.3.6.6 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, the decision dE, the variables dEp and dEq and the variable $t_C$ as inputs, and the number of filtered samples nDp and nDq from each side of the block boundary and the filtered sample values $p_i'$ and $q_j'$ as outputs.

When nDp is greater than 0, the filtered sample values $p_i'$ with i=0 . . . nDp-1 replace the corresponding samples inside the sample array recPicture as follows:

$$recPicture[xCb+xBl-i-1][yCb+yBl+k] = p_i' \quad (1313)$$

When nDq is greater than 0, the filtered sample values $q_j'$ with j=0 . . . nDq-1 replace the corresponding samples inside the sample array recPicture as follows:

$$recPicture[xCb+xBl+j][yCb+yBl+k] = q_j' \quad (1314)$$

3. When dE is equal to 3, for each sample location (xCb+xBl, yCb+yBl+k), k=0 . . . 3, the following ordered steps apply:
The filtering process for a luma sample using long filters as specified in clause 8.8.3.6.7 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, and $t_C$ as inputs and the filtered samples values $p_i'$ and $q_j'$ as outputs.

The filtered sample values $p_i'$ with i=0 . . . maxFilterLengthP-1 replace the corresponding samples inside the sample array recPicture as follows:

$$recPicture[xCb+xBl-i-1][yCb+yBl+k] = p_i' \quad (1315)$$

The filtered sample values $q_j'$ with j=0 . . . maxFilterLengthQ-1 replace the corresponding samples inside the sample array recPicture as follows:

$$recPicture[xCb+xBl+j][yCb+yBl+k] = q_j' \quad (1316)$$

Otherwise (edgeType is equal to EDGE_HOR), the following ordered steps apply:
1. The sample values $p_{i,k}$ and $q_{j,k}$ with i=0 . . . maxFilterLengthP, j=0 . . . maxFilterLengthQ and k=0 . . . 3 are derived as follows:

$$q_{j,k} = recPicture[xCb+xBl+k][yCb+yBl+j] \quad (1317)$$

$$p_{i,k} = recPicture[xCb+xBl+k][yCb+yBl-i-1] \quad (1318)$$

2. When dE is not equal to 0 and dE is not equal to 3, for each sample location (xCb+xBl+k, yCb+yBl), k=0 . . . 3, the following ordered steps apply:
a. The filtering process for a luma sample using short filters as specified in clause 8.8.3.6.6 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, the decision dE, the variables dEp and dEq, and the variable $t_C$ as inputs, and the number of filtered samples nDp and nDq from each side of the block boundary and the filtered sample values $p_i'$ and $i_j'$ as outputs.
b. When nDp is greater than 0, the filtered sample values $p_i'$ with i=0 . . . nDp-1 replace the corresponding samples inside the sample array recPicture as follows:

$$recPicture[xCb+xBl+k][yCb+yBl-i-1] = p_i' \quad (1319)$$

c. When nDq is greater than 0, the filtered sample values $q_j'$ with j=0 . . . nDq-1 replace the corresponding samples inside the sample array recPicture as follows:

$$recPicture[xCb+xBl+k][yCb+yBl+j] = q_j' \quad (1320)$$

3. When dE is equal to 3, for each sample location (xCb+xBl+k, yCb+yBl), k=0 . . . 3, the following ordered steps apply:
a. The filtering process for a luma sample using long filters as specified in clause 8.8.3.6.7 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, and the variable $t_C$ as inputs, and the filtered sample values $p_i'$ and $q_j'$ as outputs.
b. The filtered sample values $p_i'$ with i=0 . . . maxFilterLengthP-1 replace the corresponding samples inside the sample array recPicture as follows:

$$recPicture[xCb+xBl+k][yCb+yBl-i-1] = p_i' \quad (1321)$$

c. The filtered sample values $q_j'$ with $j=0 \ldots$ maxFilterLengthQ−1 replace the corresponding samples inside the sample array recPicture as follows:

$$\text{recPicture}[xCb+xBl+k][yCb+yBl+j]=q_j' \quad (1322)$$

The following is another excerpt from the VVC. This excerpt describes a decision process for a luma sample:

8.8.3.6.6 Decision Process for a Luma Sample

[The] Inputs to this process are:
the sample values $p_0$, $p_3$, $q_0$ and $q_3$,
the variables dpq, sp, sq, spq, sidePisLargeBlk, sideQisLargeBlk, β and $t_C$.

[The] Output of this process is the variable dSam containing a decision.

The variables sp and sq are modified as follows:
When sidePisLargeBlk is equal to 1, the following applies:

$$sp=(sp+Abs(p_3-p_0)+1)>>1 \quad (1357)$$

When sideQisLargeBlk is equal to 1, the following applies:

$$sq=(sq+Abs(q_3-q_0)+1)>>1 \quad (1358)$$

The variables sThr1 and sThr2 are is derived as follows:
If sidePisLargeBlk is equal to 1 or sideQisLargeBlk is equal to 1, the following applies:

$$sThr1=3*\beta>>5 \quad (1359)$$

$$sThr2=\beta>>4 \quad (1360)$$

Otherwise, the following applies:

$$sThr1=\beta>>3 \quad (1361)$$

$$sThr2=\beta>>2 \quad (1362)$$

The variable dSam is specified as follows:
If all of the following conditions are true, dSam is set equal to 1:
dpq is less than sThr2,
sp+sq is less than sThr1,
spq is less than $(5*t_C+1)>>1$.
Otherwise, dSam is set equal to 0.

The following is another excerpt from the VVC. This excerpt describes a filtering process for a luma sample using short filters:

8.8.3.6.7 Filtering Process for a Luma Sample Using Short Filters

[The] Inputs to this process are:
the variables maxFilterLengthP and maxFilterLengthQ,
the sample values $p_i$ and $q_j$ with $i=0 \ldots$ maxFilterLengthP and $j=0 \ldots$ maxFilterLengthQ,
a variable dE,
the variables dEp and dEq containing decisions to filter samples p1 and q1, respectively,
a variable $t_C$.

[The] Outputs of this process are:
the number of filtered samples nDp and nDq,
the filtered sample values $p_i'$ and $c_j'$ with $i=0 \ldots$ nDp−1, $j=0 \ldots$ nDq−1.

Depending on the value of dE, the following applies:
If the variable dE is equal to 2, nDp and nDq are both set equal to 3 and the following strong filtering applies:

$$p_0'=\text{Clip3}(p_0-3*t_C,p_0+3*t_C,(p_2+2*p_1+2*p_0+2*q_0+q_1+4)>>3) \quad (1363)$$

$$p_1'=\text{Clip3}(p_1-2*t_C,p_1+2*t_C,(p_2+p_1+p_0+q_0+2)>>2) \quad (1364)$$

$$p_2'=\text{Clip3}(p_2-1*t_C,p_2+1*t_C,(2*p_3+3*p_2+p_1+p_0+q_0+4)>>3) \quad (1365)$$

$$q_0'=\text{Clip3}(q_0-3*t_C,q_0+3*t_C,(p_1+2*p_0+2*q_0+2*q_1+q_2+4)>>3) \quad (1366)$$

$$q_1'=\text{Clip3}(q_1-2*t_C,q_1+2*t_C,(p_0+q_0+q_1+q_2+2)>>2) \quad (1367)$$

$$q_2'=\text{Clip3}(q_2-1*t_C,q_2+1*t_C,(p_0+q_0+q_1+3*q_2+2*q_3+4)>>3) \quad (1368)$$

Otherwise, nDp and nDq are set both equal to 0 and the following weak filtering applies:
The following applies:

$$\Delta=(9*(q_0-p_0)-3*(q_1-p_1)+8)>>4 \quad (1369)$$

When Abs(Δ) is less than $t_C*10$, the following ordered steps apply:
The filtered sample values $p_0'$ and $q_0'$ are specified as follows:

$$\Delta=\text{Clip3}(-t_C,t_C,\Delta) \quad (1370)$$

$$p_0'=\text{Clip1}(p_0+\Delta) \quad (1371)$$

$$q_0'=\text{Clip1}(q_0-\Delta) \quad (1372)$$

When dEp is equal to 1, the filtered sample value $p_i'$ is specified as follows:

$$\Delta p=\text{Clip3}(-(t_C>>1),t_C>>1,(((p_2+p_0+1)>>1)-p_1+\Delta)>>1) \quad (1373)$$

$$p_1'=\text{Clip1}(p_1+\Delta p) \quad (1374)$$

When dEq is equal to 1, the filtered sample value $q_i'$ is specified as follows:

$$\Delta q=\text{Clip3}(-(t_C>>1),t_C>>1,(((q_2+q_0+1)>>1)-q_1-\Delta)>>1) \quad (1375)$$

$$q_1'=\text{Clip1}(q_1+\Delta q) \quad (1376)$$

nDp is set equal to dEp+1 and nDq is set equal to dEq+1.
When nDp is greater than 0 and pred_mode_plt_flag of the coding unit that includes the coding block containing the sample $p_0$ is equal to 1, nDp is set equal to 0.
When nDq is greater than 0 and pred_mode_plt_flag of the coding unit that includes the coding block containing the sample $q_0$ is equal to 1, nDq is set equal to 0.

The following is another excerpt from the VVC. This excerpt describes a filtering process for a luma sample using long filters:

8.8.3.6.8 Filtering Process for a Luma Sample Using Long Filters

[The] Inputs to this process are:
the variables maxFilterLengthP and maxFilterLengthQ,
the sample values $p_i$ and $q_j$ with $i=0 \ldots$ maxFilterLengthP and $j=0 \ldots$ maxFilterLengthQ,
a variable $t_C$.

[The] Outputs of this process are:
the filtered sample values $p_i'$ and $q_j'$ with $i=0 \ldots$ maxFilterLengthP−1, $j=0 \ldots$ maxFilterLengthQ−1.

The variable refMiddle is derived as follows:
If maxFilterLengthP is equal to maxFilterLengthQ and maxFilterLengthP is equal to 5, the following applies:

$$\text{refMiddle}=(p_4+p_3+2*(p_2+p_1+p_0+q_0+q_1+q_2)+q_3+q_4+8)>>4 \quad (1377)$$

Otherwise, if maxFilterLengthP is equal to maxFilterLengthQ and maxFilterLengthP is not equal to 5, the following applies:

$$\text{refMiddle}=(p_6+p_5+p_4+p_3+p_2+p_1+2*(p_0+q_0)+q_1+q_2+q_3+q_4+q_5+q_6+8)>>4 \qquad (1378)$$

Otherwise, if one of the following conditions are true,
maxFilterLengthQ is equal to 7 and maxFilterLengthP is equal to 5,
maxFilterLengthQ is equal to 5 and maxFilterLengthP is equal to 7,
the following applies:

$$\text{refMiddle}=(p_5+p_4+p_3+p_2+2*(p_1+p_0+q_0+q_1)+2+q_3+q_4+q_5+8)>>4 \qquad (1379)$$

Otherwise, if one of the following conditions are true,
maxFilterLengthQ is equal to 5 and maxFilterLengthP is equal to 3,
maxFilterLengthQ is equal to 3 and maxFilterLengthP is equal to 5,
the following applies:

$$\text{refMiddle}=(p_3+p_2+p_1+p_0+q_0+q_1+q_2+q_3+4)>>3 \qquad (1380)$$

Otherwise, if maxFilterLengthQ is equal to 7 and maxFilterLengthP is equal to 3, the following applies:

$$\text{refMiddle}=(2*(p_2+p_1+p_0+q_0)+p_0+p_1+q_1+q_2+q_3+q_4+q_5+q_6+8)>>4 \qquad (1381)$$

Otherwise, the following applies:

$$\text{refMiddle}=(p_6+p_5+p_4+p_3+p_2+p_1+2*(q_2+q_1+q_0+p_0)+q_0+q_1+8)>>4 \qquad (1382)$$

The variables refP and refQ are derived as follows:

$$\text{refP}=(p_{maxFilterLengtP}+p_{maxFilterLengthP-1}+1)>>1 \qquad (1383)$$

$$\text{refQ}=(q_{maxFilterLengtQ}+q_{maxFilterLengthQ-1}+1)>>1 \qquad (1384)$$

The variables $f_i$ and $t_C PD_i$ are defined as follows:
If maxFilterLengthP is equal to 7, the following applies:

$$f_{0\ldots6}=\{59,50,41,32,23,14,5\} \qquad (1385)$$

$$t_C PD_{0\ldots6}=\{6,5,4,3,2,1,1\} \qquad (1386)$$

Otherwise, if maxFilterLengthP is equal to 5, the following applies:

$$f_{0\ldots4}=\{58,45,32,19,6\} \qquad (1387)$$

$$t_C PD_{0\ldots4}=\{6,5,4,3,2\} \qquad (1388)$$

Otherwise, the following applies:

$$f_{0\ldots2}=\{53,32,11\} \qquad (1389)$$

$$t_C PD_{0\ldots2}=\{6,4,2\} \qquad (1390)$$

The variables $g_i$ and $t_C QD_j$ are defined as follows:
If maxFilterLengthQ is equal to 7, the following applies:

$$g_{0\ldots6}=\{59,50,41,32,23,14,5\} \qquad (1391)$$

$$t_C QD_{0\ldots6}=\{6,5,4,3,2,1,1\} \qquad (1392)$$

Otherwise, if maxFilterLengthQ is equal to 5, the following applies:

$$g_{0\ldots4}=\{58,45,32,19,6\} \qquad (1393)$$

$$t_C QD_{0\ldots4}=\{6,5,4,3,2\} \qquad (1394)$$

Otherwise, the following applies:

$$g_{0\ldots2}=\{53,32,11\} \qquad (1395)$$

$$t_C QD_{0\ldots2}=\{6,4,2\} \qquad (1396)$$

The filtered sample values $p_i'$ and $q_j'$ with $i=0 \ldots$ maxFilterLengthP−1 and $j=0 \ldots$ maxFilterLengthQ−1 are derived as follows:

$$p_i'=\text{Clip3}(p_i-(t_C*t_C PD_i>>1),p_i+(t_C*t_C PD_i>>1),(\text{refMiddle}*f_i+\text{refP}*(64-f_i)+32)>>6) \qquad (1397)$$

$$q_j'=\text{Clip3}(q_j-(t_C*t_C QD_j>>1),q_j+(t_C*t_C QD_j>>1),(\text{refMiddle}*g_j+\text{refQ}*(64-g_j)+32)>>6) \qquad (1398)$$

When pred_mode_plt_flag of the coding unit that includes the coding block containing the sample $p_i$ is equal to 1, the filtered sample value, $p_i'$ is substituted by the corresponding input sample value $p_i$ with $i=0 \ldots$ maxFilterLengthP−1.

When pred_mode_plt_flag of the coding unit that includes the coding block containing the sample $q_i$ is equal to 1, the filtered sample value, $q_i'$ is substituted by the corresponding input sample value $q_j$ with $j=0 \ldots$ maxFilterLengthQ−1.

To adapt video coding for good subjective video quality adaptive quantization parameter (QP) of the transform coefficients are deployed. One exemplarily adaptive QP method is to derive variance of a block and give a low QP to blocks with low variance and a higher QP to blocks with high variance. This enables better accuracy of smooth blocks than of blocks with lots of details. This make more efficient use of bits where they matter most.

SUMMARY

Deblocking filtering in HEVC and VVC are excellent in reducing the amount of block artifacts, but when faced with larger areas of very smooth reconstructed samples e.g. due to the use of larger transform sizes in future codecs, deblocking could benefit from further extensions of the deblocking length. Adaptive quantization parameter (QP) can help to some extent to give better quality in smooth areas, but that also comes with an overhead in bitrate for coding of such areas with high quality.

Embodiments provide an extra-long tap deblocking filter solution to handle deblocking of coarsely quantized large smooth blocks. Embodiments include techniques to determine when the extra-long tap deblocking filter shall be used but also techniques to perform the filtering operations. Extra-long tap deblocking filter corresponds to deblocking of more than 7 samples of a line of samples on at least one side of the block boundary. The examples described herein specifically apply to the luma component but are also applicable for the chroma component or other color components.

Embodiments can greatly improve the visual quality of SDR and HDR video especially for relative smooth regions like sky, smoke, and water, and when the quality setting becomes more challenging. This corresponds to QP above around 27 for VVC and HEVC.

According to a first aspect, a method for deblocking is provided. The method includes checking whether a current block is smooth. The method includes checking whether an adjacent block is smooth. The adjacent block is adjacent to a boundary of the current block. The method includes determining that a criteria is true. The criteria comprises one or more of the current block and the adjacent block being smooth. The method includes, as a result of determining that the criteria is true, applying a long-tap deblocking across the boundary of the current block. A length of the long-tap deblocking is greater than 7.

According to a second aspect, a method for deblocking is provided. The method includes checking whether a size of a current block exceeds a size threshold. The method includes checking whether a size of an adjacent block exceeds the size threshold. The adjacent block is adjacent to a boundary of the current block. The method includes determining that a criteria is true. The criteria comprises both a size of the current block and a size of the adjacent block exceeding the size threshold. The method includes, as a result of determining that the criteria is true, applying a long-tap deblocking across the boundary of the current block. A length of the long-tap deblocking is greater than 7.

According to a third aspect, a computer program is provided, comprising instructions which when executed by processing circuitry of a node, causes the node to perform the method of any of the embodiments of the first and second aspects.

According to a fourth aspect, a carrier is provided, containing the computer program of the third aspect. The carrier is one of an electronic signal, an optical signal, a radio signal, and a computer readable storage medium.

According to a fifth aspect, an encoder is provided. The encoder includes processing circuitry. The encoder includes a memory, the memory containing instructions executable by the processing circuitry. When the instructions are executed, the encoder is configured to perform the method of any one the embodiments of the first and second aspects.

According to a sixth aspect, a decoder is provided. The decoder includes processing circuitry. The decoder includes a memory, the memory containing instructions executable by the processing circuitry. When the instructions are executed, the encoder is configured to perform the method of any one the embodiments of the first and second aspects.

BRIEF DESCRIPTION OF THE DRAWINGS

The accompanying drawings, which are incorporated herein and form part of the specification, illustrate various embodiments.

DETAILED DESCRIPTION

Figure 1:
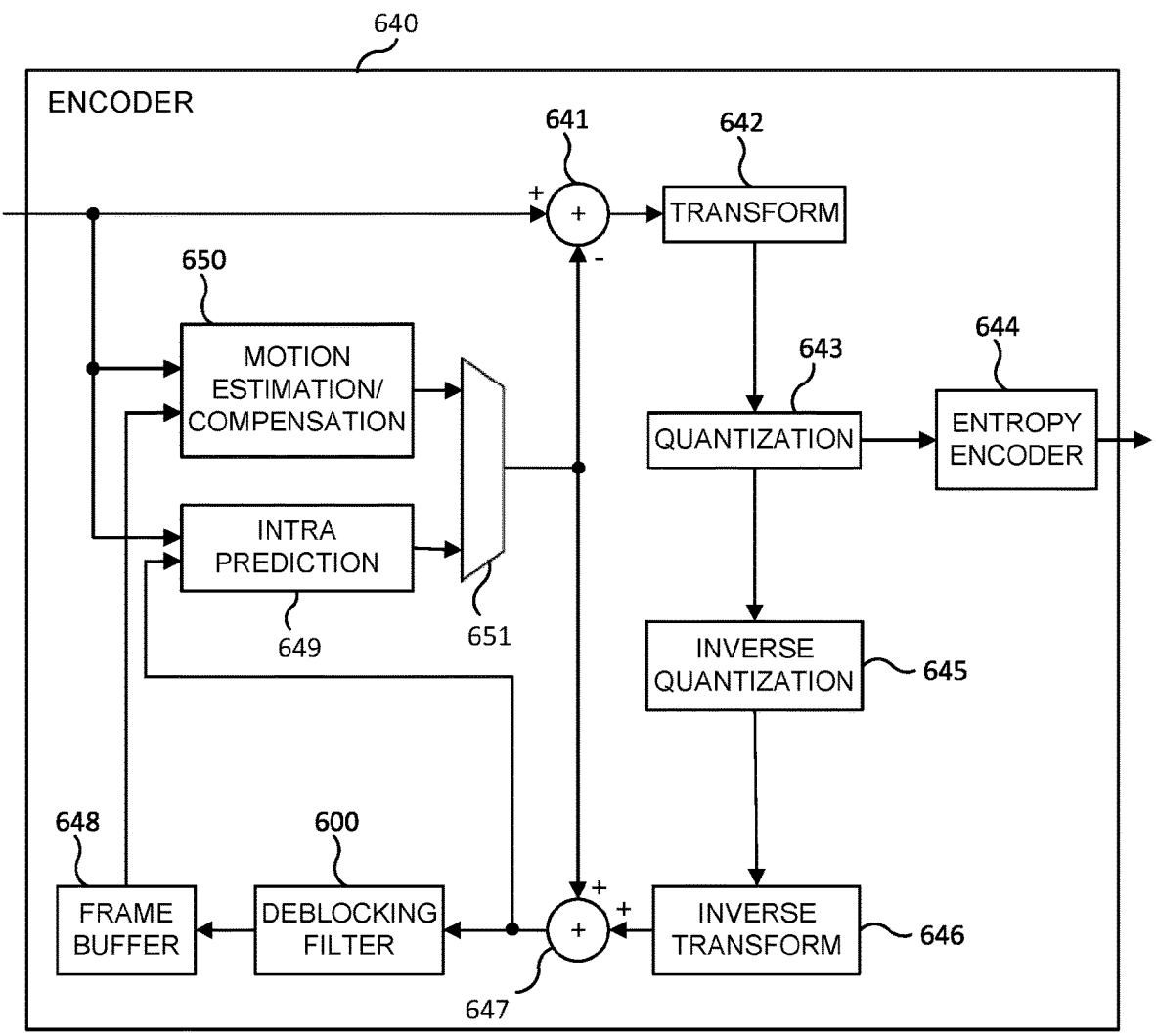
FIG. 1 is an example architecture of an encoder according to an embodiment.
Figure 2:
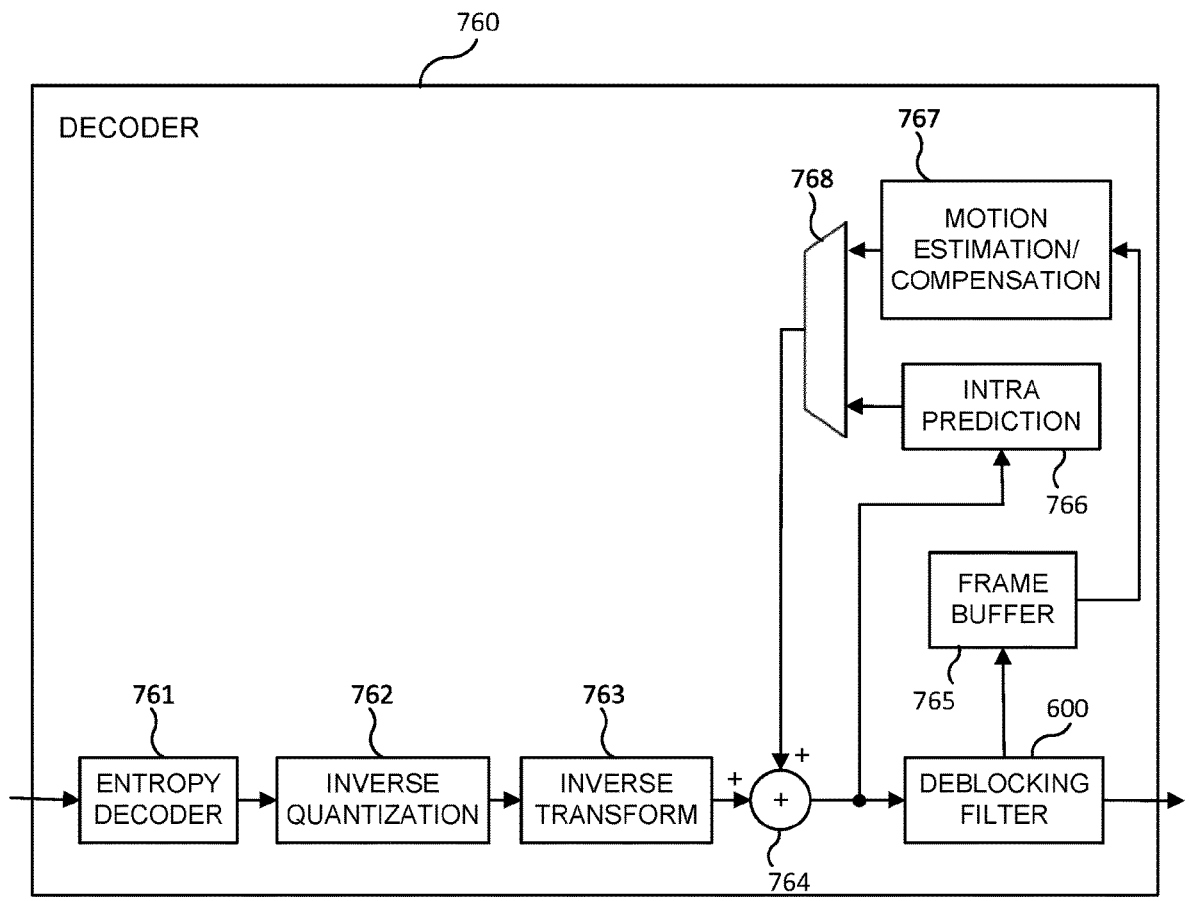
FIG. 2 is an example architecture of a decoder according to an embodiment.

One aspect of some embodiments is to provide longer deblocking filters. The longer deblocking filters can also be aligned with the VVC design. Another aspect is to provide decisions for when to enable the long deblocking filters. The decisions can also be aligned with the VVC design. Embodiments may be used with image and video encoding and decoding where it can enhance deblocking. An exemplary encoder is shown in FIG. 1, and an exemplary decoder is shown in FIG. 2, both of which use deblocking as illustrated. Other in-loop tools may be performed before or after the deblocking, but other in-loop filters are not included in FIG. 1 and FIG. 2. Embodiments could also be applied as a post-filter outside the coding loop but before display. However, in that case, coding artifacts may appear inside large blocks since they are not removed from the coding/decoding loop.

Embodiment 1 (Decision Based on Smoothness of a Large Block)

Based on reconstructed samples of a large coding block, typically luma samples but also chroma samples or other color components, model parameters may be determined for a polynomial model (at least a one parameter model e.g. a constant, but preferably at least a three parameter model with a constant, slope in x and slope in y, e.g. 1+x+y). In some embodiments a 2nd or higher order polynomial model may be used. A large coding block is typically of the same size as the maximum transform size or larger, and is typically larger than 64×64. Examples of large coding block sizes are width×height, 64×64, 128×128 or 256×256.

Model parameters may be applied for the large block to derive a predicted block and samples of the predicted block may be compared with the reconstructed samples to calculate a distortion or error according to an error metric. An example of a metric is sum-of-absolute-differences (SAD) or sum-of-squared-differences (SSD).

If the distortion is below a threshold the coding block may be regarded as smooth and has the risk of introducing a block artifact. The risk increases if adjacent blocks also are large coding blocks. The risk is significantly increased if a large block has non-zero transform coefficients. The risk and the visibility of a block artifact also increases with QP for blocks with QP exceeding a QP threshold (e.g., 27 in HEVC/VVC).

The smoothness can be determined on a specified granularity and the result stored in a vector or a matrix (referred to here as the determined smoothness matrix). One example granularity is a 64×64 sample. Another is 128×128. For example, a 1 can indicate that a block is smooth and a 0 can indicate that the block is not smooth. The smoothness may be determined on reconstructed samples before deblocking and can then be used for both vertical and horizontal deblocking operations. In some embodiments, the smoothness is only needed to be checked for a coding unit (CU) of size 64×64 or larger with a specified granularity of 64×64 and for CUs of size 128×128 or larger for a specified granularity of 128×128.

Figure 3A:
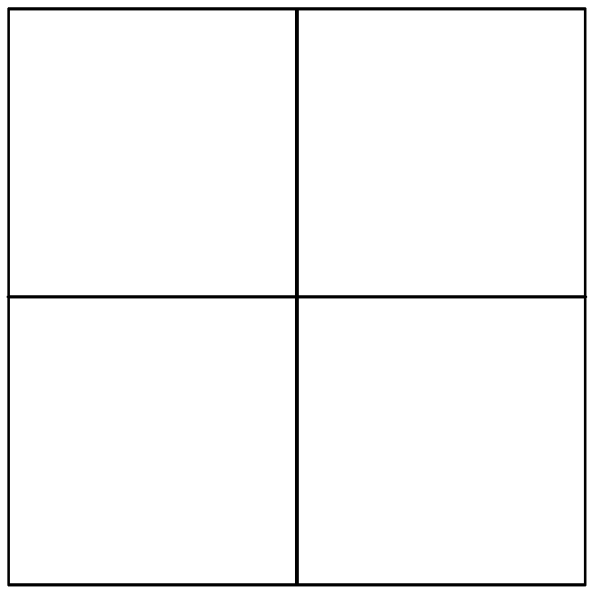
FIGS. 3A and 3B are exemplary diagrams of image blocks.
Figure 3B:
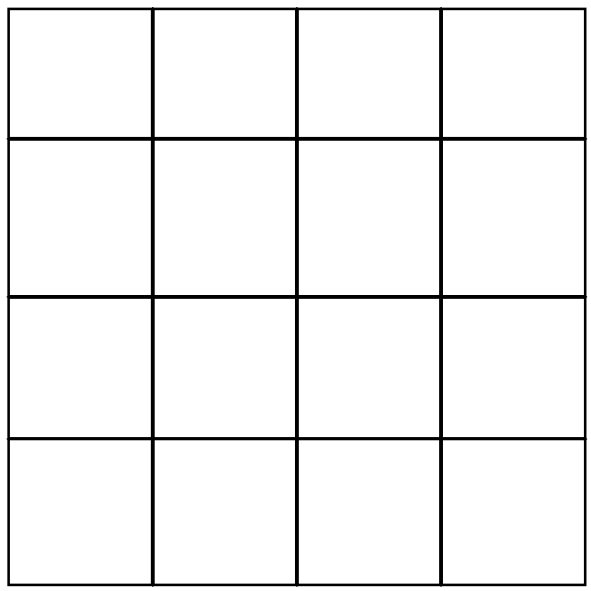

The granularity can be set to the maximum transform size, but typically should not be smaller than a size of 64×64. See FIG. 3A for an exemplary division of a CTU of 256×256 into 4 128×128 blocks and FIG. 3B for an exemplary division of a CTU of 256×256 into 16 64×64 blocks.

For a line or a segment (for example a 4 sample boundary segment) of a vertical block boundary, the determined smoothness may be checked for a position in the determined smoothness matrix corresponding to the position in left block and for a position in the determined smoothness matrix corresponding to the position in the current block. If both are smooth, extra-long tap deblocking may be performed across the vertical block boundary for the line or the lines of the segment.

Similarly, for a horizontal block boundary, the determined smoothness is checked for a position in the determined smoothness matrix corresponding to the position in the above block and for a position in the determined smoothness matrix corresponding to the position in the current block. If both are smooth, extra-long tap deblocking may be performed across the horizontal block boundary for the line or the lines of the segment.

A variant is to perform the extra-long deblocking filter also when only one of the sides is smooth.

For a line or a segment (for example a 4 sample boundary segment) of a vertical block boundary the determined smoothness is checked for a position in the determined smoothness matrix corresponding to the position in left block and for a position in the determined smoothness matrix corresponding to the position in the current block. If at least one of them is smooth, extra-long tap deblocking may be performed across the vertical block boundary for the line or the lines of the segment of the side with smooth samples.

Similarly for a horizontal block boundary, the determined smoothness is checked for a position in the determined smoothness matrix corresponding to the position in the above block and for a position in the determined smoothness matrix corresponding to the position in the current block. If at least one of them is smooth extra-long tap deblocking may be performed across the horizontal block boundary for the line or the lines of the segment on the side with smooth samples.

An exemplary extra-long tap deblocking length is greater than 7, and lengths may for example be 15, 23, or 31.

Embodiment 2 (Decision Based on Size of the Large Block)

For a line or a segment (for example a 4 sample boundary segment) of a vertical block boundary, if the width of the transform block to the left is equal to or larger than a threshold (e.g. 64, 128) and the width of the current transform block is equal to or larger than the threshold (e.g. 64, 128), extra-long tap deblocking may be performed across the vertical boundary for the line or the lines of the segment.

For a line or a segment (for example a 4 sample boundary segment) of a horizontal block boundary, if the height of the transform block to the left is equal to or larger than a threshold (e.g. 64, 128, 256) and the height of the current transform block is equal to or larger than the threshold (e.g. 64, 128, 256), extra-long tap deblocking may be performed across the horizontal boundary for the line or the lines of the segment.

In an alternative embodiment the check applies to both width and height, i.e. both the width and the height must be equal to or larger than the threshold (e.g. 64, 128, 256) for vertical and/or horizontal block boundaries.

In an alternative embodiment the check applies to one of the current block and the adjacent block. For example, if the size threshold (width, height, or both width and height) is met for one of the current block and the adjacent block, extra-long tap deblocking may be performed across the boundary (vertical or horizontal) for the line or the lines of the segment.

In some embodiments, the extra-long deblocking length can be equal to 15 when the threshold is 64 and can be equal to 31 when the threshold is 128 or alternatively 256.

Embodiment 3 (Conditions for Deploying Extra-Long Deblocking Filter)

A segment of a block boundary may be filtered with an extra-long deblocking length of N (N greater than 7) on at least one side of a block boundary, e.g. a modification of N samples on at least one side of the boundary, in some embodiments, when one or more conditions is found to be true. For example, exemplary conditions include:

If the current boundary is a vertical boundary between two transform blocks where at least one side has a large size, e.g. greater than or equal to a size threshold of 64×64 (or 128×128 or 256×256).

If the side with a large size has N+1 reconstructed samples of at least one line of the boundary segment that are determined to be very smooth.

In some embodiments N=15, 23, 31, and in some embodiments the value of N may be based on the size of the side with a large size. For example, an embodiment may set N=31 when the side with a large size is equal to or larger than 128×128.

In some embodiment, an alternative or additional condition is the smoothness of a large block, e.g. where smoothness is determined as described in embodiments disclosed herein.

To maintain a horizontal CTU line buffer of 4 lines for deblocking, the filter length may in some embodiments be limited to 3, as in VVC for a horizontal CTU boundary, although this may come with slight loss in perceptual quality.

Embodiment 4 (Specific Condition for Deploying Extra-Long Deblocking Filter)

Figure 4:
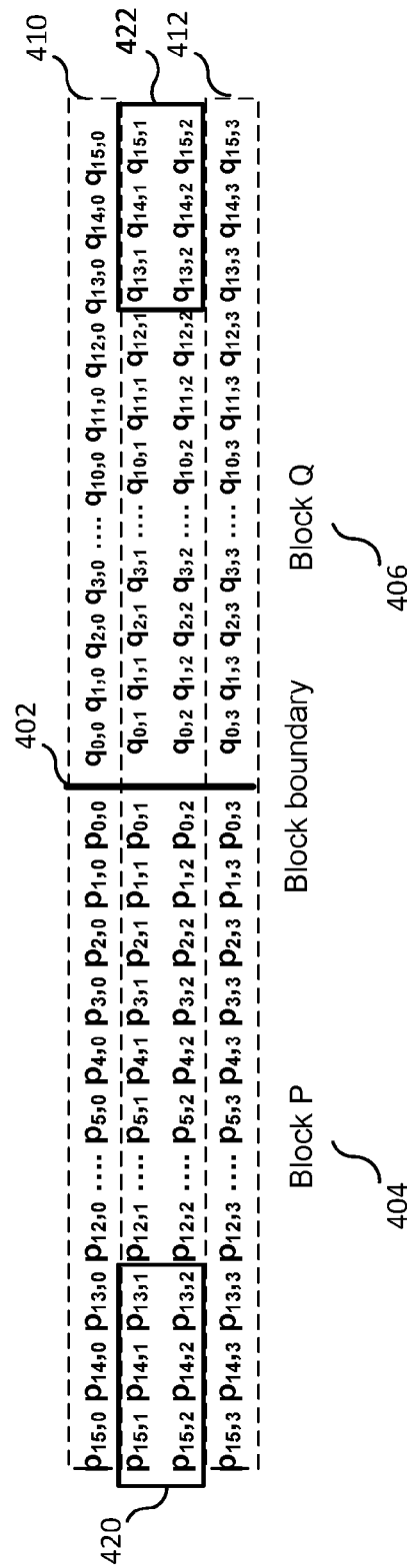
FIG. 4 is an exemplary diagram of a block boundary segment.

To ensure that natural structure is not removed on a respective side of the block boundary it is important to check all samples on the respective side of the block boundary for at least one line of the boundary segment. For example, FIG. 4 illustrates 4 lines extending 16 samples on each side of a block boundary 402. Samples are shown from a block P (404) and a block Q (406). The top-most illustrated line is surrounded by dashed box 410 and the bottom-most illustrated line is surrounded by a dashed-box 412; and six samples on the left (three from each of the two middle lines) are surrounded by a box 420 and six samples on the right (three from each of the two middle lines) are surrounded by a box 422.

In some embodiments, before applying a deblocking of a specific length L, it may first be checked that L+1 samples on a respective side of the boundary are smooth for at least one line of the boundary segment. If so, the deblocking may be applied as planned. For example, for a length of 15, it may be checked that 16 samples are smooth on a respective side of the boundary for at least one line; and for a length of 31, it may be checked that 32 samples are smooth on a respective side of the boundary for at least one line.

A measure that can be used to check many samples to determine whether they are smooth is to take the absolute value of a difference of a line of samples on one side of the block boundary as $|\Sigma_{i=0}^{N} p(i)*mlt(i)|$, where the sum is over N+1 samples in the block P, N is the deblocking length, and $mlt(i)=+1$ if $i<(N+1)/4$ or $i>3(N+1)/4$ and $mlt(i)=-1$ otherwise. That is, the sum of the first (N+1)/4 samples minus the next (N+1)/2 samples plus the last (N+1)/4 samples, where N is the deblocking length. In embodiments, the first sample (p0) is directly adjacent to the block boundary, and the second sample (p1) is one sample away from the first sample, and so on.

As an example for a deblocking length of 31 and for a line of samples in block P:

value=Abs($p0+p1+p2+p3+p4+p5+p6+p7-p8-p9-p10-p11-p12-p13-p14-p15-p16-p17-p18-p19-p20-p21-p22-p23+p24+p25+p26+p27+p28+p29+p30+p31$)

As an example for a deblocking length of 31 and for a line of samples in block Q:

value=Abs($q0+q1+q2+q3+q4+q5+q6+q7-q8-q9-q10-q11-q12-q13-q14-q15-q16-q17-q18-q19-q20-q21-q22-q23+q24+q25+q26+q27+q28+q29+q30+q31$)

As an example for a deblocking length of 15 and for a line of samples in block P:

value=Abs($p0+p1+p2+p3-p4-p5-p6-p7-p8-p9-p10-p1+p12+p13+p14+p15$)

As an example for a deblocking length of 15 and for a line of samples in block Q:

value=Abs($q0+q1+q2+q3-q4-q5-q6-q7-q8-q9-q10-q11+q12+q13+q14+q15$)

The respective absolute value is then compared with a threshold, e.g. based on β (a QP dependent deblocking parameter). If the absolute value is below a threshold the condition holds and the samples are regarded as smooth. The absolute value can in some embodiments be added to other checks, for example to check if the outermost samples (e.g., those shown in boxes 420, 422) have some activity, and then compare with a threshold. If the sum of checks is below a threshold the condition holds and the samples are regarded as smooth.

For example sp0L, sp3L, sq0L and sq3L as in VVC can be extended to include samples as in this embodiment as follows:

When maxFilterLengthP is 15:

sp0L=sp0+(Abs($p_{15,0}-p_{14,0}-p_{13,0}+p_{12,0}$)+Abs($p_{15,0}+p_{14,0}+p_{13,0}+p_{12,0}-p_{11,0}-p_{10,0}-p_{9,0}-p_{8,0}-p_{7,0}-p_{6,0}-p_{5,0}-p_{4,0}+p_{3,0}+p_{2,0}+p_{1,0}+p_{0,0}$)+1)>>1  (1287)

sp3L=sp3+(Abs($p_{15,3}-p_{14,3}-p_{13,3}+p_{12,3}$)+Abs($p_{15,3}+p_{14,3}+p_{13,3}+p_{12,3}-p_{11,3}-p_{10,3}-p_{9,3}-p_{8,3}-p_{7,3}-p_{6,3}-p_{5,3}-p_{4,3}+p_{3,3}+p_{2,3}+p_{1,3}+p_{0,3}$)+1)>>1  (1288)

When maxFilterLengthQ is 15:

sq0L=sq0+(Abs($q_{15,0}-q_{14,0}-q_{13,0}-q_{12,0}$)+Abs($q_{15,0}+q_{14,0}+q_{13,0}+q_{12,0}-q_{11,0}-q_{10,0}-q_{9,0}-q_{8,0}-q_{7,0}-q_{6,0}-q_{5,0}-q_{4,0}+q_{3,0}+q_{2,0}+q_{1,0}+q_{0,0}$)+1)>>1  (1291)

sq3L=sq3+(Abs($q_{15,3}-q_{14,3}-q_{13,3}+q_{12,3}$)+Abs($q_{15,3}+q_{14,3}+q_{13,3}+q_{12,3}-q_{11,3}-q_{10,3}-q_{9,3}-q_{8,3}-q_{7,3}-q_{6,3}-q_{5,3}-q_{4,3}+q_{3,3}+q_{2,3}+q_{1,3}+q_{0,3}$)+1)>>1  (1292)

Or alternatively as follows:
When maxFilterLengthP is 15:

sp0L=sp0+(Abs($p_{15,0}-2p_{14,0}+p_{13,0}$)+Abs($p_{15,0}+p_{14,0}+p_{13,0}+p_{12,0}-p_{11,0}-p_{10,0}-p_{9,0}-p_{8,0}-p_{7,0}-p_{6,0}-p_{5,0}-p_{4,0}+p_{3,0}+p_{2,0}+p_{1,0}+p_{0,0}$)+1)>>1  (1287)

sp3L=sp3+(Abs($p_{15,3}-2p_{14,3}+p_{13,3}$)+Abs($p_{15,3}+p_{14,3}+p_{13,3}+p_{12,3}-p_{11,3}-p_{10,3}-p_{9,3}-p_{8,3}-p_{7,3}-p_{6,3}-p_{5,3}-p_{4,3}+p_{3,3}+p_{2,3}+p_{1,3}+p_{0,3}$)+1)>>1  (1288)

When maxFilterLengthQ is 15:

sq0L=sq0+(Abs($q_{15,0}-2q_{14,0}+q_{13,0}$)+Abs($q_{15,0}+q_{14,0}+q_{13,0}+q_{12,0}-q_{11,0}-q_{10,0}-q_{9,0}-q_{8,0}-q_{7,0}-q_{6,0}-q_{5,0}-q_{4,0}+q_{3,0}+q_{2,0}+q_{1,0}+q_{0,0}$)+1)>>1  (1291)

sq3L=sq3+(Abs($q_{15,3}-2q_{14,3}+q_{13,3}$)+Abs($q_{15,3}+q_{14,3}+q_{13,3}+q_{12,3}-q_{11,3}-q_{10,3}-q_{9,3}-q_{8,3}-q_{7,3}-q_{6,3}-q_{5,3}-q_{4,3}+q_{3,3}+q_{2,3}+q_{1,3}+q_{0,3}$)+1)>>1  (1292)

To avoid re-computation of filter decisions for multiple samples, the specific check could be performed on samples that not have been tested so much by other checks, the principle is to have M of the samples in the beginning and the end and 2M samples in the middle that have negative sign.

Again for an example for a deblocking length of 31 and for a line of samples in block P, here M is equal to 7:

value=Abs($p4+p5+p6+p7+p8+p9+p10-p11-p12-p13-p14-p15-p16-p17-p18-p19-p20-p21-p22-p23-p24+p25+p26+p27+p28+p29+p30+p31$)

A similar variation for an example for a deblocking length of 31 and for a line of samples in block Q:

value=Abs($q4+q5+q6+q7+q8+q9+q10-q11-q12-q13-q14-q15-q16-q17-q18-q19-q20-q21-q22-q23-q24+q25+q26+q27+q28+q29+q30+q31$)

Again for an example for a deblocking length of 31 and for a line of samples in block P, here M is equal to 6:

value=Abs($p6+p7+p8+p9+p10+p11-p12-p13-p14-p15-p16-p17-p18-p19-p20-p21-p22-p23+p24+p25+p26+p27+p28+p29$)

A similar variation for an example for a deblocking length of 31 and for a line of samples in block Q:

value=Abs($q6+q7+q8+q9+q10+q11-q12-q13-q14-q15-q16-q17-q18-q19-q20-q21-q22-q23+q24+q25+q26+q27+q28+q29$)

Embodiment 5 (Additional Checks for Line 1 and Line 2)

To make the decision to select an extra-long deblocking filter even more robust, additional smoothness checks may be added for the outermost samples used for deblocking, such as those shown in FIG. 4 surrounded by boxes 420 and 422.

Let N be the deblocking length. Additional measures for line 1 and line 2 of a four line boundary segment can be performed as on respective side of the block boundary based on the following:

value1=Abs($p_{N+1}-2p_N+p_{N-1}$) on P side and value2=Abs($q_{N+1}-2q_N+q_{N-1}$) on Q side When the measures (i.e. value1 and value2) are below a threshold (e.g. based on β) the segment is regarded as smooth.

A variant is to also make smoothness check for the samples close to the block boundary on line 1 and 2 on a respective side of the block boundary based on the following:

value1'=Abs($p_{N+1}-2p_N+p_{N-1}$)+Abs($p_2-2p_1+p_0$)

value2'=Abs($q_{N+1}-2q_N+q_{N-1}$)+Abs($q_2-2q_1+q_0$)

When the measures (i.e. value1' and value2') are below a threshold (e.g. based on β) the segment is regarded as smooth.

A second variant is to make the decision for line 1 and line 2 in the same was as for the extra-long deblocking filter for line 0 and line 3, as in other embodiments, at least for the additional samples included by the extra-long deblocking filter.

In some embodiments, other samples may be selected to perform a smoothness measure on.

Embodiment 6 (Fall Back to Long Tap Deblocking)

In some embodiments, before performing an extra-long tap deblocking of length N, additional conditions are checked about whether deblocking for one or more lengths less than N are satisfied. If conditions for deblocking of length N is satisfied, then length N is used. However, if conditions for deblocking of length N is not satisfied, then the maximum length that has been checked and where conditions are satisfied is used.

For example, if it has been determined that a deblocking length of 15 is suitable on at least one side of a block boundary, a first check may be performed to determine if long-tap deblocking filter decisions with a limitation of extra-long deblocking length to a deblocking length to 7 applies. If such condition holds, then a second check may be performed to determine if extra-long tap deblocking for a deblocking length of 15 on at least one side of the block boundary is satisfied. The extra-long tap deblocking is applied if the condition for extra-long tap deblocking decision holds, otherwise deblocking with length 7 on at least one side and 7 or smaller on the other side is applied.

If a long-tap decision doesn't hold, a condition may be checked for a shorter filter length than 5, and deblocking with shorter length than 5 may be applied if such condition hold.

In a variant of this embodiment, after the first check holds it is checked if a deblocking length of 31 can be used. Extra-long tap deblocking with length 31 is then applied if the condition for extra-long tap deblocking decision holds, otherwise if such condition does not hold then check if a deblocking length of 15 can be used. Extra-long tap deblocking with length 15 is applied if such condition holds, otherwise deblocking with length 7 on at least one side and 7 or smaller on the other side is applied.

Embodiment 7 (Restriction for Prediction Sub-Block Deblocking)

Similar to prediction sub-block deblocking in VVC, it may be needed to align longer deblocking filter lengths when a block uses deblocking of prediction sub-block boundaries inside the block and parallel to the block boundary. Embodiments enable deblocking if deblocking block/transform block boundaries and deblocking prediction sub-block boundaries may occur without interaction. In VVC the limitation is set to 5 which also could be used here but with a risk of too little deblocking in some cases where a longer deblocking length is preferred. For that reason, for a long deblocking length of 15 the first prediction and last sub-block boundary can be skipped and the limitation of deblocking length applies to the second and the second last sub-block boundary instead of the first and last as in VVC, e.g 2+2 for the second and second last sub-block boundary and then the deblocking length 15 can be reduced to 13 for the block/transform block boundary.

An alternative is that when a segment of a boundary of a transform block has been determined to use the extra-long filter, no deblocking of prediction subblocks for boundaries parallel to the transform block boundary inside the transform block is performed. A variation is to not apply any deblocking of prediction sub-block boundaries parallel to the transform block boundary inside the coding unit (CU) if the CU size is equal to or larger than 64×64. Yet another variation is to not apply any deblocking of prediction sub-block boundaries parallel to the transform block boundary and inside the transform block of size equal to or larger than 64×64.

A variant is to not deploy sub-block deblocking for an area which has been determined to be smooth according some other embodiment. All variants make sure that there is no interaction with sub-block deblocking and extra-long deblocking, e.g. that deblocking filtering of samples by prediction sub-block deblocking is not read by extra-long deblocking of block/transform block and vice versa.

Embodiment 8 (Extra-Long Deblocking Filter)

When it has been decided to filter with an extra-long filter the filtering can be performed in the same spirit as the long-tap deblocking in VVC but with longer filters as defined below for a line i to be filtered.

First example filters for deblocking length 31:

filterLengthP=31 and filterLengthQ=31

$$\text{refMiddle}_i = (p_{0,i} + p_{1,i} + p_{2,i} + p_{3,i} + q_{0,i} + q_{1,i} + q_{2,i} + q_{3,i} + 4) >> 3$$

This (refMiddle$_i$) may alternatively defined the same as for length 7 on both sides (preferred since it is the same as length 7). The more samples that are included in refMiddle the stronger the filter gets. For example:

$$\text{refMiddle}_i = (2p_{0,i} + p_{1,i} + p_{2,i} + p_{3,i} + p_{4,i} + p_{5,i} + p_{6,i} + 2q_{0,i} + q_{1,i} + q_{2,i} + q_{3,i} + q_{4,i} + q_{5,i} + q_{6,i} + 8) >> 4$$

Yet another alternative is to use more samples on each side:

$$\text{refMiddle}_i = (2p_{0,i} + p_{1,i} + p_{2,i} + p_{3,i} + p_{4,i} + p_{5,i} + p_{6,i} + p_{7,i} + p_{8,i} + p_{9,i} + p_{10,i} + p_{11,i} + p_{12,i} + p_{13,i} + p_{14,i} + 2q_{0,i} + q_{1,i} + q_{2,i} + q_{3,i} + q_{4,i} + q_{5,i} + q_{6,i} + q_{7,i} + q_{8,i} + q_{9,i} + q_{10,i} + q_{11,i} + q_{12,i} + q_{13,i} + q_{14,i} + 16) >> 5$$

Yet another alternative is to use even more samples on each side:

$$\text{refMiddle}_i = (2p_{0,i} + p_{1,i} + p_{2,i} + p_{3,i} + p_{4,i} + p_{5,i} + p_{6,i} + p_{7,i} + p_{8,i} + p_{9,i} + p_{10,i} + p_{11,i} + p_{12,i} + p_{13,i} + p_{14,i} + p_{15,i} + p_{16,i} + p_{17,i} + p_{18,i} + p_{19,i} + p_{20,i} + p_{21,i} + p_{22,i} + p_{23,i} + p_{24,i} + p_{25,i} + p_{26,i} + p_{27,i} + p_{28,i} + p_{29,i} + p_{30,i} + 2q_{0,i} + q_{1,i} + q_{2,i} + q_{3,i} + q_{4,i} + q_{5,i} + q_{6,i} + q_{7,i} + q_{8,i} + q_{9,i} + q_{10,i} + q_{11,i} + q_{12,i} + q_{13,i} + q_{14,i} + q_{15,i} + q_{16,i} + q_{17,i} + q_{18,i} + q_{19,i} + q_{20,i} + q_{21,i} + q_{22,i} + q_{23,i} + q_{24,i} + q_{25,i} + q_{26,i} + q_{27,i} + q_{28,i} + q_{29,i} + q_{30,i} + 32) >> 6$$

Then refP and refQ may be used as follows:

$$\text{refP} = (p_{31,i} + p_{30,i} + 1) >> 1$$

$$\text{refQ} = (q_{31,i} + q_{30,i} + 1) >> 1$$

filterLengthP=3 and filterLengthQ=31 (if desired to keep line buffers same as in VVC):

$$\text{refMiddle}_i = (p_{0,i} + p_{1,i} + p_{2,i} + p_{3,i} + q_{0,i} + q_{1,i} + q_{2,i} + q_{3,i} + 4) >> 3$$

$$\text{refP} = (p_{3,i} + p_{2,i} + 1) >> 1$$

$$\text{refQ} = (q_{31,i} + q_{30,i} + 1) >> 1$$

Second example filters for deblocking length 15.

filterLengthP=15 and filterLengthQ=15

$$\text{refMiddle}_i = (p_{0,i} + p_{1,i} + p_{2,i} + p_{3,i} + q_{0,i} + q_{1,i} + q_{2,i} + q_{3,i} + 4) >> 3$$

This (refMiddle$_i$) may alternatively defined the same as for length 7 on both sides (preferred since it is the same as length 7):

$$\text{refMiddle}_i = (2p_{0,i} + p_{1,i} + p_{2,i} + p_{3,i} + p_{4,i} + p_{5,i} + p_{6,i} + 2q_{0,i} + q_{1,i} + q_{2,i} + q_{3,i} + q_{4,i} + q_{5,i} + q_{6,i} + 8) >> 4$$

Yet another alternative is to use more samples on each side:

$$\text{refMiddle}_i = (2p_{0,i} + p_{1,i} + p_{2,i} + p_{3,i} + p_{4,i} + p_{5,i} + p_{6,i} + p_{7,i} + p_{8,i} + p_{9,i} + p_{10,i} + p_{11,i} + p_{12,i} + p_{13,i} + p_{14,i} + 2q_{0,i} + q_{1,i} + q_{2,i} + q_{3,i} + q_{4,i} + q_{5,i} + q_{6,i} + q_{7,i} + q_{8,i} + q_{9,i} + q_{10,i} + q_{11,i} + q_{12,i} + q_{13,i} + q_{14,i} + 16) >> 5$$

Then refP and refQ as follows:

$$\text{refP} = (p_{15,i} + p_{14,i} + 1) >> 1$$

$$\text{refQ} = (q_{15,i} + q_{14,i} + 1) >> 1$$

filterLengthP=3 and filterLengthQ=15 (if desired to keep line buffers the same as in VVC)

$$\text{refMiddle}_i=(p_{0,i}+p_{1,i}+p_{2,i}+p_{3,i}+q_{0,i}+q_{1,i}+q_{2,i}+q_{3,i}+4)>>3$$

Alternatively refMiddle can be defined same as in VVC for filterLengthP=3 and filterLengthQ=7 as $$\text{refMiddle}_i=(3p_{0,i}+3p_{1,i}+2p_{2,i}+2q_{0,i}+q_{1,i}+q_{2,i}+q_{3,i}+q_{4,i}+q_{5,i}+q_{6,i}+8)>>4$$

Then refP and refQ as follows:

$$\text{refP}=(p_{3,i}+p_{2,i}+1)>>1$$

$$\text{refQ}=(q_{15,i}+q_{14,i}+1)>>1$$

Additional cases are filterLengthP=5 and filterLengthQ=15 (or filterLengthP=15 and filterLengthQ=5), here refMiddle can be design same as in VVC for filterLengthP=5 and filterLengthQ=7 as $$\text{refMiddle}_i=(2p_{0,i}+2p_{1,i}+p_{2,i}+p_{3,i}+p_{4,i}+p_{5,i}+2q_{0,i}+2q_{1,i}+q_{2,i}+q_{3,i}+q_{4,i}+q_{5,i}+8)>>4$$

Then refP and refQ as follows:

$$\text{refP}=(p_{\text{filterLengthP},i}+p_{\text{filterLengthP-1},i}+1)>>1$$

$$\text{refQ}=(q_{\text{filterLengthQ},i}+q_{\text{filterLengthQ-1},i}+1)>>1$$

filterLengthP=7 and filterLengthQ=15 15 (or filterLengthP=15 and filterLengthQ=5) can have refMiddle defined as (same as in VVC for filterLengthP=7 and filterLengthQ=7)

$$\text{refMiddle}_i=(2p_{0,i}+p_{1,i}+p_{2,i}+p_{3,i}+p_{4,i}+p_{5,i}+p_{6,i}+2q_{0,i}+q_{1,i}+q_{2,i}+q_{3,i}+q_{4,i}+q_{5,i}+q_{6,i}+8)>>4$$

Then refP and refQ as follows:

$$\text{refP}=(p_{\text{filterLengthP},i}+p_{\text{filterLengthP-1},i}+1)>>1$$

$$\text{refQ}=(q_{\text{filterLengthQ},i}+q_{\text{filterLengthQ-1},i}+1)>>1$$

Third example filters for deblocking length 13. filterLengthP=13 and filterLengthQ=13

$$\text{refMiddle}_i=(p_{0,i}+p_{1,i}+p_{2,i}+p_{3,i}+q_{0,i}+q_{1,i}+q_{2,i}+q_{3,i}+4)>>3$$

This (refMiddle$_i$) may alternatively defined the same as for length 7 on both sides:

$$\text{refMiddle}_i=(2p_{0,i}+p_{1,i}+p_{2,i}+p_{3,i}+p_{4,i}+p_{5,i}+p_{6,i}+2q_{0,i}+q_{1,i}+q_{2,i}+q_{3,i}+q_{4,i}+q_{5,i}+q_{6,i}+8)>>4$$

Then refP and refQ as follows:

$$\text{refP}=(p_{13,i}+p_{14,i}+1)>>1$$

$$\text{refQ}=(q_{13,i}+q_{14,i}+1)>>1$$

filterLengthP=3 and filterLengthQ=13 (if desired to keep line buffers the same as in VVC):

$$\text{refMiddle}_i=(p_{0,i}+p_{1,i}+p_{2,i}+p_{3,i}+q_{0,i}+q_{1,i}+q_{2,i}+q_{3,i}+4)>>3$$

$$\text{refP}=(p_{3,i}+p_{2,i}+1)>>1$$

$$\text{refQ}=(q_{13,i}+q_{12,i}+1)>>1$$

Here is an example of length 23.
filterLengthP=23 and filterLengthQ=23

$$\text{refMiddle}_i=(p_{0,i}+p_{1,i}+p_{2,i}+p_{3,i}+q_{0,i}+q_{1,i}+q_{2,i}+q_{3,i}+4)>>3$$

This (refMiddle$_i$) may alternatively defined the same as for length 7 on both sides (preferred since it is the same as length 7):

$$\text{refMiddle}_i=(2p_{0,i}+p_{1,i}+p_{2,i}+p_{3,i}+p_{4,i}+p_{5,i}+p_{6,i}+2q_{0,i}+q_{1,i}+q_{2,i}+q_{3,i}+q_{4,i}+q_{5,i}+q_{6,i}+8)>>4$$

Yet another alternative is to use more samples on each side:

$$\text{refMiddle}_i=(2p_{0,i}+p_{1,i}+p_{2,i}+p_{3,i}+p_{4,i}+p_{5,i}+p_{6,i}+p_{7,i}+p_{8,i}+p_{9,i}+p_{10,i}+p_{11,i}+p_{12,i}+p_{13,i}+p_{14,i}+2q_{0,i}+q_{1,i}+q_{2,i}+q_{3,i}+q_{4,i}+q_{5,i}+q_{6,i}+q_{7,i}+q_{8,i}+q_{9,i}+q_{10,i}+q_{11,i}+q_{12,i}+q_{13,i}+q_{14,i}+16)>>5$$

Then refP and refQ as follows:

$$\text{refP}=(p_{23,i}+p_{22,i}+1)>>1$$

$$\text{refQ}=(q_{23,i}+q_{22,i}+1)>>1$$

filterLengthP=3 and filterLengthQ=23 (if desired to keep line buffers the same as in VVC)

$$\text{refMiddle}_i=(p_{0,i}+p_{1,i}+p_{2,i}+p_{3,i}+q_{0,i}+q_{1,i}+q_{2,i}+q_{3,i}+4)>>3$$

$$\text{refP}=(p_{3,i}+p_{2,i}+1)>>1$$

$$\text{refQ}=(q_{23,i}+q_{220,i}+1)>>1$$

Then the filtered value is determined by linear interpolation between refP and refMiddle, and between refQ and refMiddle, which also can be found in VVC (equations 1397 and 1398) but for shorter deblocking lengths than here.

$$p'_{k,i}=(f_k*\text{refMiddle}+(64-f_k)*\text{refP}+32)>>6$$

$$q'_{l,i}=(g_l*\text{refMiddle}+(64-g_l)*\text{refQ}+32)>>6$$

where for a deblocking length of 31 on both sides:
f=g={63, 61, 59, 57, 55, 53, 51, 49, 46, 44, 42, 40, 38, 36, 34, 32, 30, 28, 26, 24, 22, 20, 18, 15, 13, 11, 9, 7, 5, 3, 1};
for a deblocking length of 15 on both sides:
f=g={62, 58, 53, 49, 45, 41, 36, 32, 28, 23, 19, 15, 11, 6, 2}
for a deblocking length of 23 on both sides:
f=g={63, 60, 57, 54, 51, 49, 46, 43, 40, 38, 35, 32, 29, 26, 24, 21, 18, 15, 13, 10, 7, 4, 1}
With higher precision of the interpolation (scale factor 128).

$$p'_{k,i}=(f_k*\text{refMiddle}+(128-f_k)*\text{refP}+64)>>7$$

$$q'_{l,i}=(g_l*\text{refMiddle}+(128-g_l)*\text{refQ}+64)>>7$$

where for a deblocking length of 31 on both sides:
f=g={126, 122, 118, 114, 109, 105, 101, 97, 93, 89, 85, 81, 76, 72, 68, 64, 60, 56, 52, 47, 43, 39, 35, 31, 27, 23, 19, 14, 10, 6, 2};
for a deblocking length of 15 on both sides:
f=g={124, 115, 107, 98, 90, 81, 73, 64, 55, 47, 38, 30, 21, 13, 4}
for a deblocking length of 23 on both sides:
f=g={125, 120, 114, 109, 103, 97, 92, 86, 81, 75, 70, 64, 58, 53, 47, 42, 36, 31, 25, 19, 14, 8, 3}
Then the position dependent clipping table in VVC can be extended such that a clipping value is obtained for each position to be filtered.

One approach to extend is extend with 1 e.g. no scaling of tc and base it on the length 7 tc scaling otherwise. Another approach is to not use any scaling of tc.

Embodiment 9 (Specific Conditions for Extra-Long Deblocking Filter, Length 15)

This embodiment is similar to embodiment 6. First it is checked if conditions with a restricted deblocking length with a maximum of 7 is fulfilled. That can for example be performed as in VVC by a modification in 8.8.3.6.2 (Decision process for luma block edges), as follows. Before maxFilterLengthP and maxFilterLengthQ are used, the deblocking length on both sides is first checked, and if it is greater than 7 on at least one side then the actual deblocking length is stored and the restriction of the deblocking length may be made:

When maxFilterLengthP>7 or maxFilerLengthQ>7:

maxFilterLengthPActual=maxFilterLengthP maxFilerLengthQActual=maxFilterLengthQ maxFilterLengthP=max(7,maxFilerLengthP)

maxFilterLengthQ=max(7,maxFilerLengthQ).

If the conditions in 8.8.3.6.6 (Decision process for a luma sample) are fulfilled, additional checks for the actual deblocking length may be made as follows:

---

Firstly sp0L15, sp3L15, sq0L15, sq3L15, dp0L15, dp3L15, dq0L15, dq3L15 are initialized to 0.
If (maxFilterLengthPActual == 15) {
  sp0L15 = Abs($p_{15,0} - p_{11,0}$) + Abs($p_{11,0} - p_{7,0}$)
  dp0L15 = Abs( $p_{15,0} - 2*p_{14,0} + p_{13,0}$)+ Abs( $p_{12,0} - 2*p_{11,0} + p_{10,0}$) + Abs( $p_{9,0} - p_{8,0} - p_{7,0} + p_{6,0}$)
  sp3L15 = Abs($p_{15,3} - p_{11,3}$) + Abs($p_{11,3} - p_{7,3}$)
  dp3L15 = Abs($p_{15,3} - 2*p_{14,3} + p_{13,3}$) + Abs( $p_{12,3} - 2*p_{11,3} + p_{10,3}$) + Abs( $p_{9,3} - p_{8,3} - p_{7,3} + p_{6,3}$)
}
If (maxFilterLengthQActual == 15) {
  sq0L15 = Abs($q_{15,0} - q_{11,0}$) + Abs($q_{11,0} - q_{7,0}$)
  dq0L15 = Abs( $q_{15,0} - 2*q_{14,0} + q_{13,0}$)+ Abs( $q_{12,0} - 2*q_{11,0} + q_{10,0}$) + Abs( $q_{9,0} - q_{8,0} - q_{7,0} + q_{6,0}$)
  sq3L15 = Abs($q_{15,3} - q_{11,3}$) + Abs($q_{11,3} - q_{7,3}$)
  dq3L15 = Abs( $q_{15,3} - 2*q_{14,3} + q_{13,3}$)+ Abs( $q_{12,3} - 2*q_{11,3} + q_{10,3}$) + Abs( $q_{9,3} - q_{8,3} - q_{7,3} + q_{6,3}$)
}

---

If the following checks are true, deblocking with the extra-long filter is performed, maxFilterLengthP=maxFilterLengtPActual and maxFilterLengthQ=maxFilterLengthQActual, otherwise deblocking with the restricted deblocking length is performed (e.g. max deblocking length of 7):

sp0L15+sq0L15<thr1 dp0L15+dq0L15<thr2 sp3L15+sq3L15<thr1 dp3L15+dq3L15<thr2 where thr1 (in some embodiments) is equal to $3*\beta>>6$ and thr2 (in some embodiments) is equal to $\beta>>5$.

In another embodiment the additional checks are also made for line 1 and line 2 of the four sample long boundary segment.

In another embodiment this approach of checking additional samples and increasing the deblocking length by 7 can be continued in steps of 7 to a maximum actual length. Examples in other embodiments cover extension to a deblocking length of 23 and 31, but a similar principle could be used for extending the deblocking length further if needed. It is also possible to increase filter length by multiples of 7 and perform the in-between checks, for example from 7 to 31. In another embodiment, a reduction of thresholds thr1 and thr2 is performed in each step of additional checks to make sure that the deblocking does not remove natural signal variations.

Embodiment 10 (Specific Conditions for Extra-Long Deblocking Filter, Length 23)

This embodiment is similar to embodiment 9. First it is checked if conditions with a restricted deblocking length with a maximum of 7 is fulfilled. That can be performed as in VVC. If that is fulfilled additional checks with a maximum deblocking length of 15 is performed. If that is fulfilled additional checks for the actual deblocking length is made as follows:

---

Firstly sp0L23, sp3L23, sq0L23, sq3L23, dp0L23, dp3L23, dq0L23, dq3L23 are initialized to 0.
If (maxFilterLengthP == 23) {
  sp0L23 = Abs($p_{23,0} - p_{19,0}$) + Abs($p_{19,0} - p_{15,0}$)
  dp0L23 = Abs( $p_{23,0} - 2*p_{22,0} + p_{21,0}$)+ Abs( $p_{20,0} - 2*p_{19,0} + p_{18,0}$) + Abs( $p_{17,0} - p_{16,0} - p_{15,0} + p_{14,0}$)
  sp3L23 = Abs($p_{23,3} - p_{19,3}$) + Abs($p_{19,3} - p_{15,3}$)
  dp3L23 = Abs( $p_{23,3} - 2*p_{22,3} + p_{21,3}$)+ Abs( $p_{20,3} - 2*p_{19,3} + p_{18,3}$) + Abs( $p_{17,3} - p_{16,3} - p_{15,3} + p_{14,3}$)
}
If (maxFilterLengthQ == 23) {
  sq0L23 = Abs($q_{23,0} - q_{19,0}$) + Abs($q_{19,0} - q_{15,0}$)
  dq0L23 = Abs( $q_{23,0} - 2*q_{22,0} + q_{21,0}$)+ Abs( $q_{20,0} - 2*q_{19,0} + q_{18,0}$) + Abs( $q_{17,0} - q_{16,0} - q_{15,0} + q_{14,0}$)

-continued

```
sq3L23 = Abs(q_{23,3} − q_{19,3}) + Abs(q_{19,3} − q_{15,3})
dq3L23 = Abs( q_{23,3} − 2*q_{22,3} + q_{21,3})+ Abs( q_{20,3} − 2*q_{19,3} + q_{18,3}) + Abs( q_{17,3} − q_{16,3} − q_{15,3} + q_{14,3})
}
```

If the following checks are true, deblocking with the extra-long filter is performed, otherwise deblocking with the restricted deblocking length is performed:

sp0L23+sq0L23<thr1 dp0L23+dq0L23<thr2 sp3L23+sq3L23<thr1 dp3L23+dq3L23<thr2 where thr1 is equal to $3*\beta >> 6$ and thr2 is equal to $\beta >> 5$

In another embodiment the additional checks are also made for line 1 and line 2 of the four sample long boundary segment.

Embodiment 11 (Specific Conditions for Extra-Long Deblocking Filter, Length 31)

This embodiment is similar to embodiment 10. First it is checked if conditions with a restricted deblocking length with a maximum of 7 is fulfilled. That can be performed as in VVC. If that is fulfilled additional checks with a maximum deblocking length of 15 is performed. If that is fulfilled additional checks for a maximum deblocking length of 23 is performed. If that is fulfilled additional checks for the actual deblocking length is made as follows:

```
Firstly sp0L31, sp3L31, sq0L31, sq3L31, dp0L31, dp3L31, dq0L31, dq3L31 are initialized to 0.
If (maxFilterLengthP == 31) {
sp0L31=Abs(p_{31,0} − p_{27,0}) + Abs(p_{27,0} − p_{23,0})
dp0L31=Abs( p_{31,0} − 2*p_{30,0} + p_{29,0})+ Abs(p_{28,0} − 2*p_{27,0} + p_{26,0}) + Abs(p_{25,0} − p_{24,0} − p_{23,0} + p_{22,0})
sp3L31= Abs(p_{31,3} − p2_{7,3}) + Abs(p_{27,3} − p_{23,3})
dp3L31= Abs( p_{31,3} − 2*p_{30,3} + p_{29,3})+ Abs(p_{28,3} − 2*p_{27,3} + p_{26,3}) + Abs(p_{25,3} − p_{24,3} − p_{23,3} + p_{22,3})
}
If (maxFilterLengthQ == 31) {
sq0L31 = Abs(q_{31,0} − q_{27,0}) + Abs(q_{27,0} − q_{23,0})
dq0L31 = Abs( q_{31,0} − 2*q_{30,0} + q_{29,0})+ Abs( q_{28,0} − 2*q_{27,0} + q_{26,0}) + Abs( q_{25,0} − q_{24,0} − q_{23,0} + q_{22,0})
sq3L31 = Abs(q_{31,3} − q_{27,3}) + Abs(q_{27,3} − q_{23,3})
dq3L31 = Abs( q_{31,3} − 2* q_{30,3} + q_{29,3})+ Abs( q_{28,3} − 2*q_{27,3} + q_{26,3}) + Abs( q_{25,3} − q_{24,3} − q_{23,3} + q_{22,3})
}
```

If the following checks are true, deblocking with the extra-long filter is performed, otherwise deblocking with the restricted deblocking length is performed:

sp0L31+sq0L31<thr1 dp0L31+dq0L31<thr2 sp3L31+sq3L31<thr1 dp3L31+dq3L31<thr2 where thr1 is equal to $3*\beta >>6$ and thr2 is equal to $\beta >>5$. In an alternative embodiment the thresholds are thr1 equal to $3*\beta >>7$ and thr2 equal to $\beta >>6$.

In another embodiment the additional checks are also made for line 1 and line 2 of the four sample long boundary segment.

Figure 5:
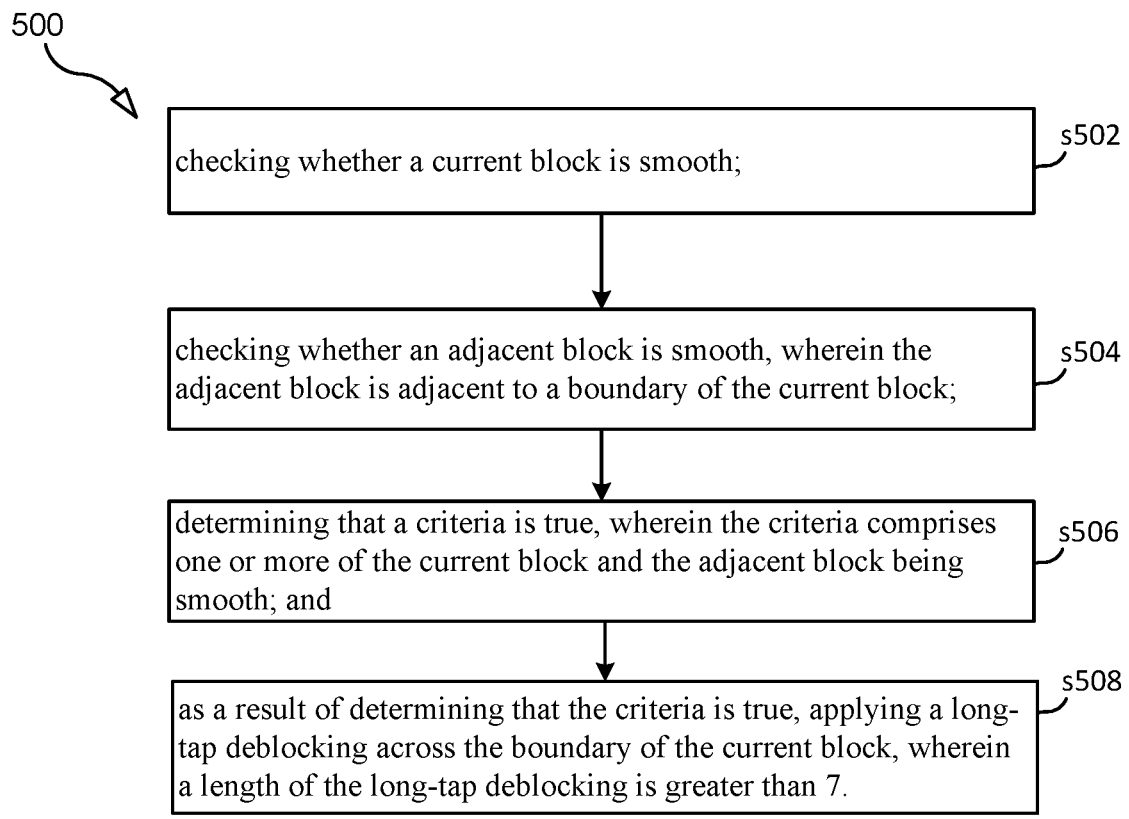
FIG. 5 is a flow chart according to an embodiment.

FIG. 5 illustrates a flow chart according to an embodiment. Process 500 is a method for deblocking. The method may begin with step s502.

Step s502 comprises checking whether a current block is smooth.

Step s504 comprises checking whether an adjacent block is smooth, wherein the adjacent block is adjacent to a boundary of the current block.

Step s506 comprises determining that a criteria is true, wherein the criteria comprises one or more of the current block and the adjacent block being smooth.

Step s508 comprises, as a result of determining that the criteria is true, applying a long-tap deblocking across the boundary of the current block, wherein a length of the long-tap deblocking is greater than 7.

In some embodiments, the criteria further comprises both the current block and the adjacent block being smooth. In some embodiments, the boundary of the current block comprises a vertical block boundary and the block adjacent to the boundary of the current block comprises a block to the left of the current block. In some embodiments, the boundary of the current block comprises a horizontal block boundary and the block adjacent to the boundary of the current block comprises a block above the current block.

In some embodiments, the method further includes, for each block in a set of blocks including the current block and the adjacent block: determining parameters of a polynomial model based on reconstructed samples of the block; predicting samples for the block based on the parameters of the polynomial model; comparing the predicted samples for the block with the reconstructed samples of the block to determine an error for the block; determining whether the block is smooth based on the error for the block; and updating a smoothness matrix to indicate whether the block is smooth based on the determination. In some embodiments, checking whether a current block is smooth comprises performing a lookup operation on the smoothness matrix for the current block and checking whether an adjacent block is smooth comprises performing a lookup operation on the smoothness matrix for the adjacent block. In some embodiments, for each block in the set of blocks, the error for the block comprises one of a sum-of-absolute-differences (SAD) value and a sum-of-squared-differences (SSD) value.

In some embodiments, a size of the current block is at least 64×64. In some embodiments, the criteria further comprises one or more of (i) a first size of the current block and a second size of the adjacent block both exceeding a size threshold; (ii) the current block having a non-zero transform coefficient; and (iii) a quantization parameter (QP) of the current block exceeding a QP threshold. In some embodiments, the method further includes, prior to applying a long-tap deblocking across the boundary of the current block, determining that a measure of a line of samples in the current block is below a threshold. In some embodiments, the measure of samples in the current block is calculated as the absolute value of the sum $\Sigma_i[p(i)*mlt(i)]$, where the sum is over the line of samples in the current block, p(i) refers to the respective samples, and mlt(i) is +1 for the first and last (N+1)/4 samples and −1 otherwise, where N is the number of the samples.

In some embodiments, applying a long-tap deblocking across the boundary of the current block comprises checking a condition on both sides of the boundary of the current block and setting a length of the long-tap deblocking based on the checking the condition on both sides of the boundary of the current block.

In some embodiments, the condition comprises sp0L15+sq0L15<thr1, dp0L15+dq0L15<thr2, sp3L15+sq3L15<thr1, and dp3L15+dq3L15<thr2;
where:

$$sp0L15 = \text{Abs}(p_{15,0} - p_{11,0}) + \text{Abs}(p_{11,0} - p_{7,0}),$$

$$dp0L15 = \text{Abs}(p_{15,0} - 2*p_{14,0} + p_{13,0}) + \text{Abs}(p_{12,0} - 2*p_{11,0} + p_{10,0}) + \text{Abs}(p_{9,0} - p_{8,0} - p_{7,0} + p_{6,0}),$$

$$sp3L15 = \text{Abs}(p_{15,3} - p_{11,3}) + \text{Abs}(p_{11,3} - p_{7,3}),$$

$$dp3L15 = \text{Abs}(p_{15,3} - 2*p_{14,3} + p_{13,3}) + \text{Abs}(p_{12,3} - 2*p_{11,3} + p_{10,3}) + \text{Abs}(p_{9,3} - p_{8,3} - p_{7,3} + p_{6,3}),$$

$$sq0L15 = \text{Abs}(q_{15,0} - q_{11,0}) + \text{Abs}(q_{11,0} - q_{7,0}),$$

$$dq0L15 = \text{Abs}(q_{15,0} - 2*q_{14,0} + q_{13,0}) + \text{Abs}(q_{12,0} - 2*q_{11,0} + q_{10,0}) + \text{Abs}(q_{9,0} - q_{8,0} - q_{7,0} + q_{6,0}),$$

$$sq3L15 = \text{Abs}(q_{15,3} - q_{11,3}) + \text{Abs}(q_{11,3} - q_{7,3}), \text{ and}$$

$$dq3L15 = \text{Abs}(q_{15,3} - 2*q_{14,3} + q_{13,3}) + \text{Abs}(q_{12,3} - 2*q_{11,3} + q_{10,3}) + \text{Abs}(q_{9,3} - q_{8,3} - q_{7,3} + q_{6,3}),$$

wherein P represents the current block and $p_{i,j}$ represent samples in P, Q represents the adjacent block and $q_{i,j}$ represent samples in Q, thr1 is a first threshold, thr2 is a second threshold.

In some embodiments, the condition comprises sp0L23+sq0L23<thr1, dp0L23+dq0L23<thr2, sp3L23+sq3L23<thr1, and dp3L23+dq3L23<thr2;
where:

$$sp0L23 = \text{Abs}(p_{23,0} - p_{19,0}) + \text{Abs}(p_{19,0} - p_{15,0}),$$

$$dp0L23 = \text{Abs}(p_{23,0} - 2*p_{22,0} + p_{21,0}) + \text{Abs}(p_{20,0} - 2*p_{19,0} + p_{18,0}) + \text{Abs}(p_{17,0} - p_{16,0} - p_{15,0} + p_{14,0}),$$

$$sp3L23 = \text{Abs}(p_{23,3} - p_{19,3}) + \text{Abs}(p_{19,3} - p_{15,3}),$$

$$dp3L23 = \text{Abs}(p_{23,3} - 2*p_{22,3} + p_{21,3}) + \text{Abs}(p_{20,3} - 2*p_{19,3} + p_{18,3}) + \text{Abs}(p_{17,3} - p_{16,3} - p_{15,3} + p_{14,3}),$$

$$sq0L23 = \text{Abs}(q_{23,0} - q_{19,0}) + \text{Abs}(q_{19,0} - q_{15,0}),$$

$$dq0L23 = \text{Abs}(q_{23,0} - 2*q_{22,0} + q_{21,0}) + \text{Abs}(q_{20,0} - 2*q_{19,0} + q_{18,0}) + \text{Abs}(q_{17,0} - q_{16,0} - q_{15,0} + q_{14,0}),$$

$$sq3L23 = \text{Abs}(q_{23,3} - q_{19,3}) + \text{Abs}(q_{19,3} - q_{15,3}),$$

$$dq3L23 = \text{Abs}(q_{23,3} - 2*q_{22,3} + q_{21,3}) + \text{Abs}(q_{20,3} - 2*q_{19,3} + q_{18,3}) + \text{Abs}(q_{17,3} - q_{16,3} - q_{15,3} + q_{14,3}),$$

wherein P represents the current block and $p_{i,j}$ represent samples in P, Q represents the adjacent block and $q_{i,j}$ represent samples in Q, thr1 is a first threshold, thr2 is a second threshold.

In some embodiments, the condition comprises sp0L31+sq0L31<thr1, dp0L31+dq0L31<thr2, sp3L31+sq3L31<thr1, and dp3L31+dq3L31<thr2;
where:

$$sp0L31 = \text{Abs}(p_{31,0} - p_{27,0}) + \text{Abs}(p_{27,0} - p_{23,0}),$$

$$dp0L31 = \text{Abs}(p_{31,0} - 2*p30,0 + p29,0) + \text{Abs}(p28,0 - 2*p27,0 + p26,0) + \text{Abs}(p25,0 - p24,0 - p23,0 + p22,0),$$

$$sp3L31 = \text{Abs}(p_{31,3} - p_{27,3}) + \text{Abs}(p_{27,3} - p_{23,3}),$$

$$dp3L31 = \text{Abs}(p_{31,3} - 2*p_{30,3} + p_{29,3}) + \text{Abs}(p_{28,3} - 2*p_{27,3} + p_{26,3}) + \text{Abs}(p_{25,3} - p_{24,3} - p_{23,3} + p_{22,3}),$$

$$sq0L31 = \text{Abs}(q_{31,0} - q_{27,0}) + \text{Abs}(q_{27,0} - q_{23,0}),$$

$$dq0L31 = \text{Abs}(q_{31,0} - 2*q_{30,0} + q_{29,0}) + \text{Abs}(q_{28,0} - 2*q_{27,0} + q_{26,0}) + \text{Abs}(q_{25,0} - q_{24,0} - q_{23,0} + q_{22,0}),$$

$$sq3L31 = \text{Abs}(q_{31,3} - q_{27,3}) + \text{Abs}(q_{27,3} - q_{23,3}),$$

$$dq3L31 = \text{Abs}(q_{31,3} - 2*q_{30,3} + q_{29,3}) + \text{Abs}(q_{28,3} - 2*q_{27,3} + q_{26,3}) + \text{Abs}(q_{25,3} - q_{24,3} - q_{23,3} + q_{22,3}),$$

wherein P represents the current block and $p_{i,j}$ represent samples in P, Q represents the adjacent block and $q_{i,j}$ represent samples in Q, thr1 is a first threshold, thr2 is a second threshold.

Figure 6:
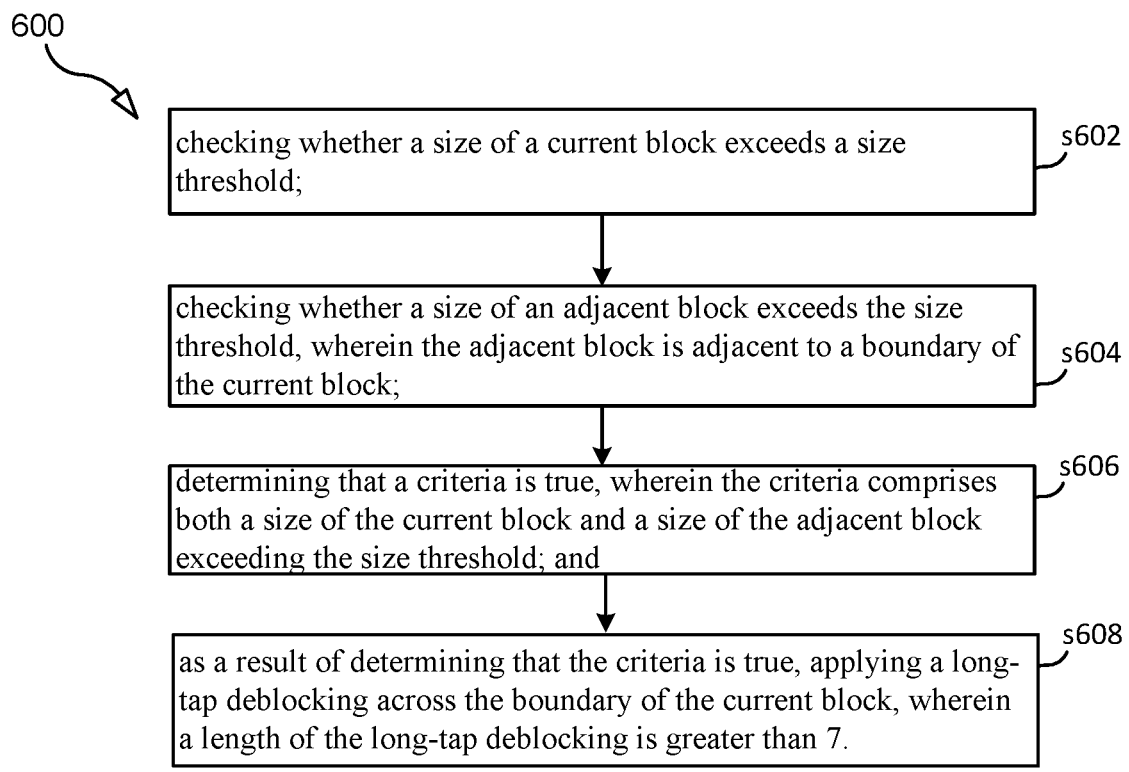
FIG. 6 is a flow chart according to an embodiment.

FIG. 6 illustrates a flow chart according to an embodiment. Process 600 is a method for deblocking. The method may begin with step s602.

Step s602 comprises checking whether a size of a current block exceeds a size threshold.

Step s604 comprises checking whether a size of an adjacent block exceeds the size threshold, wherein the adjacent block is adjacent to a boundary of the current block.

Step s606 comprises determining that a criteria is true, wherein the criteria comprises both a size of the current block and a size of the adjacent block exceeding the size threshold.

Step s608 comprises, as a result of determining that the criteria is true, applying a long-tap deblocking across the boundary of the current block, wherein a length of the long-tap deblocking is greater than 7.

In some embodiments, the boundary of the current block comprises a vertical block boundary and the block adjacent to the boundary of the current block comprises a block to the left of the current block, and wherein the size threshold includes a width component. In some embodiments, the boundary of the current block comprises a horizontal block boundary and the block adjacent to the boundary of the current block comprises a block above the current block, and wherein the size threshold includes a height component. In some embodiments, the size threshold includes both a height component and a width component. In some embodiments, a length of the long-tap deblocking is based on the size threshold. In some embodiments, the size threshold is 64×64 and the length of the long-tap deblocking is 15. In some embodiments, the size threshold is 128×128 and the length of the long-tap deblocking is 31. In some embodiments, the size threshold is 256×256 and the length of the long-tap deblocking is 31.

Figure 7:
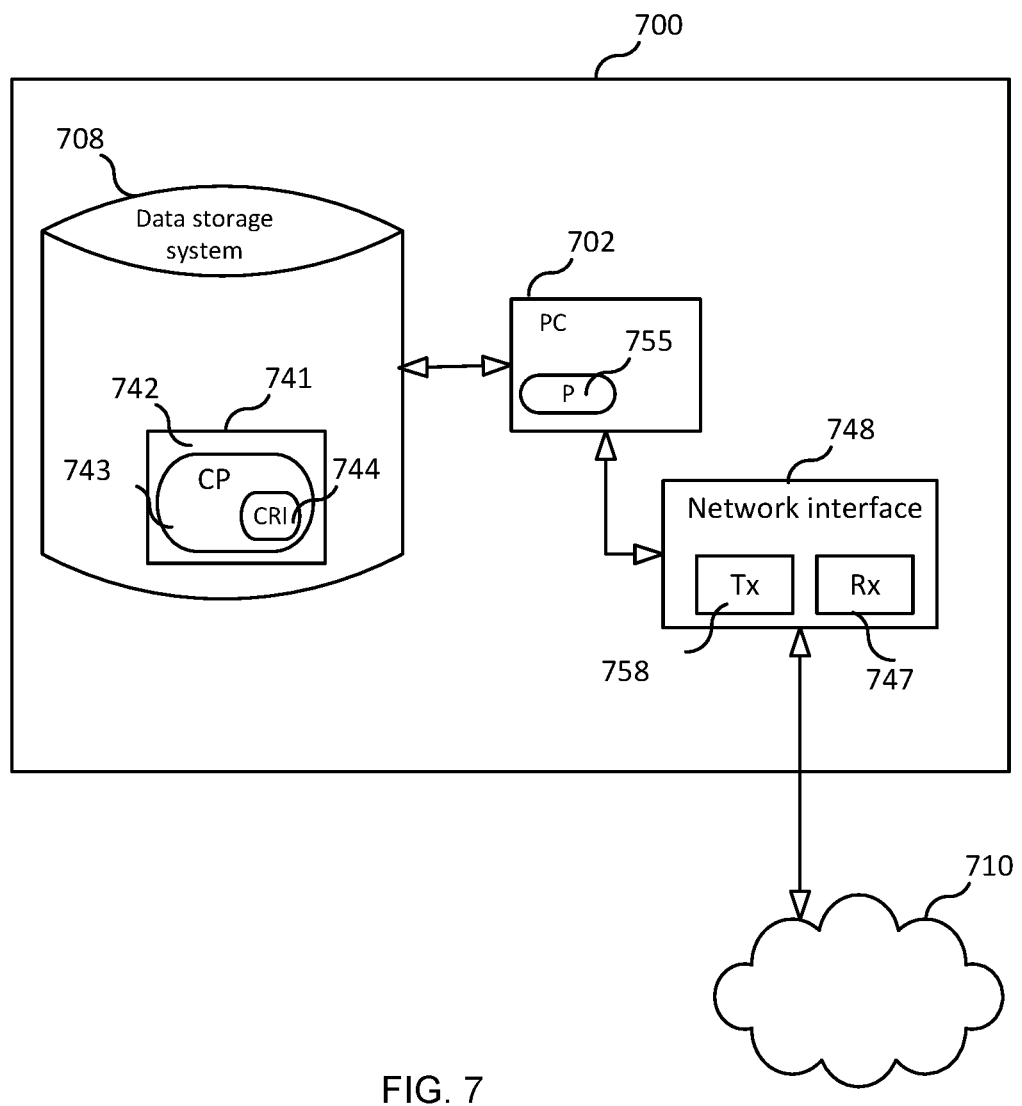
FIG. 7 is a block diagram of a node (e.g., an encoder or decoder) according to an embodiment.

FIG. 7 is a block diagram of node 700 (e.g., an encoder or decoder), according to some embodiments. As shown in FIG. 7, node 700 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., node 700 may be a distributed computing apparatus); at least one network interface 748 (e.g., a physical interface or air interface) comprising a transmitter (Tx) 745 and a receiver (Rx) 747 for enabling node 700 to transmit data to and receive data from other nodes connected to a network 710 (e.g., an Internet Protocol (IP) network) to which network interface 748 is connected (physically or wirelessly) (e.g., network interface 748 may be coupled to an antenna arrangement comprising one or more antennas for enabling node 700 to wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes node 700 to perform steps described herein (e.g., steps described herein with reference to the flow charts). In other embodiments, node 700 may be configured to perform steps described herein without the need for code. That is, for example, PC 702 may consist merely of one or more ASICs. Hence, the features of the embodiments described herein may be implemented in hardware and/or software.

As used herein, a network element, node, or subsystem (e.g., an encoder or decoder) may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Skilled artisans will recognize that the foregoing generalized example network environment may be implemented in a hierarchical network architecture, with various aspects of media capture and preparation, including, e.g., source stream stitching, projection mapping, source media compression, tiled/ABR encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Summary of Various Embodiments

A1. A method for deblocking, the method comprising:
checking whether a current block is smooth;
checking whether an adjacent block is smooth, wherein the adjacent block is adjacent to a boundary of the current block;
determining that a criteria is true, wherein the criteria comprises one or more of the current block and the adjacent block being smooth; and
as a result of determining that the criteria is true, applying a long-tap deblocking across the boundary of the current block, wherein a length of the long-tap deblocking is greater than 7.

A2. The method of embodiment A1, wherein the criteria further comprises both the current block and the adjacent block being smooth.

A3. The method of any one of embodiments A1-A2, wherein the boundary of the current block comprises a vertical block boundary and the block adjacent to the boundary of the current block comprises a block to the left of the current block.

A4. The method of any one of embodiments A1-A2, wherein the boundary of the current block comprises a horizontal block boundary and the block adjacent to the boundary of the current block comprises a block above the current block.

A5. The method of any one of embodiments A1-A4, further comprising, for each block in a set of blocks including the current block and the adjacent block:
determining parameters of a polynomial model based on reconstructed samples of the block;
predicting samples for the block based on the parameters of the polynomial model;
comparing the predicted samples for the block with the reconstructed samples of the block to determine an error for the block;
determining whether the block is smooth based on the error for the block; and
updating a smoothness matrix to indicate whether the block is smooth based on the determination.

A6. The method of embodiment A5, wherein checking whether a current block is smooth comprises performing a lookup operation on the smoothness matrix for the current block and checking whether an adjacent block is smooth comprises performing a lookup operation on the smoothness matrix for the adjacent block.

A7. The method of any one of embodiments A5-A6, wherein, for each block in the set of blocks, the error for the block comprises one of a sum-of-absolute-differences (SAD) value and a sum-of-squared-differences (SSD) value.

A8. The method of any one of embodiments A1-A7, wherein a size of the current block is at least 64×64.

A9. The method of any one of embodiments A1-A8, wherein the criteria further comprises one or more of (i) a first size of the current block and a second size of the adjacent block both exceeding a size threshold; (ii) the current block having a non-zero transform coefficient; and (iii) a quantization parameter (QP) of the current block exceeding a QP threshold.

A10. The method of any one of embodiments A1-A9, further comprising, prior to applying a long-tap deblocking across the boundary of the current block, determining that a measure of a line of samples in the current block is below a threshold.

A11. The method of embodiment A10, wherein the measure of samples in the current block is calculated as the absolute value of the sum $\Sigma_i[p(i)*mlt(i)]$, where the sum is over the line of samples in the current block, p(i) refers to the respective samples, and mlt(i) is +1 for the first and last (N+1)/4 samples and −1 otherwise, where N is the number of the samples.

A12. The method of any one of embodiments A1-A11, wherein applying a long-tap deblocking across the boundary of the current block comprises checking a condition on both sides of the boundary of the current block and setting a length of the long-tap deblocking based on the checking the condition on both sides of the boundary of the current block.

A13. The method of embodiment A12, wherein the condition comprises sp0L15+sq0L15<thr1, dp0L15+dq0L15<thr2, sp3L15+sq3L15<thr1, and dp3L15+dq3L15<thr2;
where:

$$sp0L15=Abs(p_{15,0}-p_{11,0})+Abs(p_{11,0}-p_{7,0}),$$

$$dp0L15=Abs(p_{15,0}-2*p_{14,0}+p_{13,0})+Abs(p_{12,0}-2*p_{11,0}+p_{10,0})+Abs(p_{9,0}-p_{8,0}-p_{7,0}+p_{6,0}),$$

$$sp3L15=Abs(p_{15,3}-p_{11,3})+Abs(p_{11,3}-p_{7,3}),$$

$dp3L15 = \text{Abs}(p_{15,3} - 2*p_{14,3} + p_{13,3}) + \text{Abs}(p_{12,3} - 2*p_{11,3} + p_{10,3}) + \text{Abs}(p_{9,3} - p_{8,3} - p_{7,3} + p_{6,3})$, $sq0L15 = \text{Abs}(q_{15,0} - q_{11,0}) + \text{Abs}(q_{1,0} - q_{7,0})$, $dq0L15 = \text{Abs}(q_{15,0} - 2*q_{14,0} + q_{13,0}) + \text{Abs}(q_{12,0} - 2*q_{11,0} + q_{10,0}) + \text{Abs}(q_{9,0} - q_{8,0} - q_{7,0} + q_{6,0})$, $sq3L15 = \text{Abs}(q_{15,3} - q_{11,3}) + \text{Abs}(q_{11,3} - q_{7,3})$, and $dq3L15 = \text{Abs}(q_{15,3} - 2*q_{14,3} + q_{13,3}) + \text{Abs}(q_{12,3} - 2*q_{11,3} + q_{10,3}) + \text{Abs}(q_{9,3} - q_{8,3} - q_{7,3} + q_{6,3})$, wherein P represents the current block and $p_{i,j}$ represent samples in P, Q represents the adjacent block and $q_{i,j}$ represent samples in Q, thr1 is a first threshold, thr2 is a second threshold.

A14. The method of embodiment A12, wherein the condition comprises sp0L23+sq0L23<thr1, dp0L23+dq0L23<thr2, sp3L23+sq3L23<thr1, and dp3L23+dq3L23<thr2;
where:

$sp0L23 = \text{Abs}(p_{23,0} - p_{19,0}) + \text{Abs}(p_{19,0} - p_{15,0})$, $dp0L23 = \text{Abs}(p_{23,0} - 2*p_{22,0} + p_{21,0}) + \text{Abs}(p_{20,0} - 2*p_{19,0} + p_{18,0}) + \text{Abs}(p_{17,0} - p_{16,0} - p_{15,0} + p_{14,0})$, $sp3L23 = \text{Abs}(p_{23,3} - p_{19,3}) + \text{Abs}(p_{19,3} - p_{15,3})$, $dp3L23 = \text{Abs}(p_{23,3} - 2*p_{22,3} + p_{21,3}) + \text{Abs}(p_{20,3} - 2*p_{19,3} + p_{18,3}) + \text{Abs}(p_{17,3} - p_{16,3} - p_{15,3} + p_{14,3})$, $sq0L23 = \text{Abs}(q_{23,0} - q_{19,0}) + \text{Abs}(q_{19,0} - q_{15,0})$, $dq0L23 = \text{Abs}(q_{23,0} - 2*q_{22,0} + q_{21,0}) + \text{Abs}(q_{20,0} - 2*q_{19,0} + q_{15,0}) + \text{Abs}(q_{17,0} - q_{16,0} - q_{15,0} + q_{14,0})$, $sq3L23 = \text{Abs}(q_{23,3} - q_{19,3}) + \text{Abs}(q_{19,3} - q_{15,3})$, $dq3L23 = \text{Abs}(q_{23,3} - 2*q_{22,3} + q_{21,3}) + \text{Abs}(q_{20,3} - 2*q_{19,3} + q_{18,3}) + \text{Abs}(q_{17,3} - q_{16,3} - q_{15,3} + q_{14,3})$, wherein P represents the current block and $p_{i,j}$ represent samples in P, Q represents the adjacent block and $q_{i,j}$ represent samples in Q, thr1 is a first threshold, thr2 is a second threshold.

A15. The method of embodiment A12, wherein the condition comprises sp0L31+sq0L31<thr1, dp0L31+dq0L31<thr2, sp3L31+sq3L31<thr1, and dp3L31+dq3L31<thr2;
where:

$sp0L31 = \text{Abs}(p_{31,0} - p_{27,0}) + \text{Abs}(p_{27,0} - p_{23,0})$, $dp0L31 = \text{Abs}(p_{31,0} - 2*p_{30,0} + p_{29,0}) + \text{Abs}(p_{28,0} - 2*p_{27,0} + p_{26,0}) + \text{Abs}(p_{25,0} - p_{24,0} - p_{23,0} + p_{22,0})$, $sp3L31 = \text{Abs}(p_{31,3} - p_{27,3}) + \text{Abs}(p_{27,3} - p_{23,3})$, $dp3L31 = \text{Abs}(p_{31,3} - 2*p_{30,3} + p_{29,3}) + \text{Abs}(p_{28,3} - 2*p_{27,3} + p_{26,3}) + \text{Abs}(p_{25,3} - p_{24,3} - p_{23,3} + p_{22,3})$, $sq0L31 = \text{Abs}(q_{31,0} - q_{27,0}) + \text{Abs}(q_{27,0} - q_{23,0})$, $dq0L31 = \text{Abs}(q_{31,0} - 2*q_{30,0} + q_{29,0}) + \text{Abs}(q_{28,0} - 2*q_{27,0} + q_{26,0}) + \text{Abs}(q_{25,0} - q_{24,0} - q_{23,0} + q_{22,0})$, $sq3L31 = \text{Abs}(q_{31,3} - q_{27,3}) + \text{Abs}(q_{27,3} - q_{23,3})$, $dq3L31 = \text{Abs}(q_{31,3} - 2*q_{30,3} + q_{29,3}) + \text{Abs}(q_{28,3} - 2*q_{27,3} + q_{26,3}) + \text{Abs}(q_{25,3} - q_{24,3} - q_{23,3} + q_{22,3})$, wherein P represents the current block and $p_{i,j}$ represent samples in P, Q represents the adjacent block and $q_{i,j}$ represent samples in Q, thr1 is a first threshold, thr2 is a second threshold.

B1. A method for deblocking, the method comprising:
checking whether a size of a current block exceeds a size threshold;
checking whether a size of an adjacent block exceeds the size threshold, wherein the adjacent block is adjacent to a boundary of the current block;
determining that a criteria is true, wherein the criteria comprises both a size of the current block and a size of the adjacent block exceeding the size threshold; and
as a result of determining that the criteria is true, applying a long-tap deblocking across the boundary of the current block, wherein a length of the long-tap deblocking is greater than 7.

B1'. A method for deblocking, the method comprising:
checking whether one or both of a current block and an adjacent block exceeds a size threshold, wherein the adjacent block is adjacent to a boundary of the current block;
determining that a criteria is true, wherein the criteria comprises one of a size of the current block and a size of the adjacent block exceeding the size threshold; and
as a result of determining that the criteria is true, applying a long-tap deblocking across the boundary of the current block, wherein a length of the long-tap deblocking is greater than 7.

B2. The method of any one of embodiments B1 and B1', wherein the boundary of the current block comprises a vertical block boundary and the block adjacent to the boundary of the current block comprises a block to the left of the current block, and wherein the size threshold includes a width component.

B3. The method of any one of embodiments B1 and B1', wherein the boundary of the current block comprises a horizontal block boundary and the block adjacent to the boundary of the current block comprises a block above the current block, and wherein the size threshold includes a height component.

B4. The method of any one of embodiments B1-B3, wherein the size threshold includes both a height component and a width component.

B5. The method of any one of embodiments B1-B4, wherein a length of the long-tap deblocking is based on the size threshold.

B6. The method of embodiment B5, wherein the size threshold is 64×64 and the length of the long-tap deblocking is 15.

B7. The method of embodiment B5, wherein the size threshold is 128×128 and the length of the long-tap deblocking is 31.

B8. The method of embodiment B5, wherein the size threshold is 256×256 and the length of the long-tap deblocking is 31.

B9. The method of any one of embodiments B1-B8, further comprising, prior to applying a long-tap deblocking across the boundary of the current block, determining that a measure of a line of samples in the current block is below a threshold.

B10. The method of embodiment B9, wherein the measure of samples in the current block is calculated as the absolute value of the sum $\Sigma_i[p(i)*mlt(i)]$, where the sum is over the line of samples in the current block, p(i) refers to the respective samples, and mlt(i) is +1 for the first and last (N+1)/4 samples and −1 otherwise, where N is the number of the samples.

B11. The method of any one of embodiments B1-B10, wherein applying a long-tap deblocking across the boundary of the current block comprises checking a condition on both sides of the boundary of the current block and setting a length of the long-tap deblocking based on the checking the condition on both sides of the boundary of the current block.

B12. The method of embodiment B11, wherein the condition comprises sp0L15+sq0L15<thr1, dp0L15+dq0L15<thr2, sp3L15+sq3L15<thr1, and dp3L15+dq3L15<thr2;

where:

$$sp0L15 = Abs(p_{15,0} - p_{11,0}) + Abs(p_{11,0} - p_{7,0}),$$

$$dp0L15 = Abs(p_{15,0} - 2*p_{14,0} + p_{13,0}) + Abs(p_{12,0} - 2*p_{11,0} + p_{10,0}) + Abs(p_{9,0} - p_{8,0} - p_{7,0} + p_{6,0}),$$

$$sp3L15 = Abs(p_{15,3} - p_{11,3}) + Abs(p_{11,3} - p_{7,3}),$$

$$dp3L15 = Abs(p_{15,3} - 2*p_{14,3} + p_{13,3}) + Abs(p_{12,3} - 2*p_{11,3} + p_{10,3}) + Abs(p_{9,3} - p_{8,3} - p_{7,3} + p_{6,3}),$$

$$sq0L15 = Abs(q_{15,0} - q_{11,0}) + Abs(q_{11,0} - q_{7,0}),$$

$$dq0L15 = Abs(q_{15,0} - 2*q_{14,0} + q_{13,0}) + Abs(q_{12,0} - 2*q_{11,0} + q_{10,0}) + Abs(q_{9,0} - q_{8,0} - q_{7,0} + q_{6,0}),$$

$$sq3L15 = Abs(q_{15,3} - q_{11,3}) + Abs(q_{11,3} - q_{7,3}), \text{ and}$$

$$dq3L15 = Abs(q_{15,3} - 2*q_{14,3} + q_{13,3}) + Abs(q_{12,3} - 2*q_{11,3} + q_{10,3}) + Abs(q_{9,3} - q_{8,3} - q_{7,3} + q_{6,3}),$$

wherein P represents the current block and $p_{i,j}$ represent samples in P, Q represents the adjacent block and $q_{i,j}$ represent samples in Q, thr1 is a first threshold, thr2 is a second threshold.

B13. The method of embodiment B11, wherein the condition comprises sp0L23+sq0L23<thr1, dp0L23+dq0L23<thr2, sp3L23+sq3L23<thr1, and dp3L23+dq3L23<thr2;

where:

$$sp0L23 = Abs(p_{23,0} - p_{19,0}) + Abs(p_{19,0} - p_{15,0}),$$

$$dp0L23 = Abs(p_{23,0} - 2*p_{22,0} + p_{21,0}) + Abs(p_{20,0} - 2*p_{19,0} + p_{18,0}) + Abs(p_{17,0} - p_{16,0} - p_{15,0} + p_{14,0}),$$

$$sp3L23 = Abs(p_{23,3} - p_{19,3}) + Abs(p_{19,3} - p_{15,3}),$$

$$dp3L23 = Abs(p_{23,3} - 2*p_{22,3} + p_{21,3}) + Abs(p_{20,3} - 2*p_{19,3} + p_{18,3}) + Abs(p_{17,3} - p_{16,3} - p_{15,3} + p_{14,3}),$$

$$sq0L23 = Abs(q_{23,0} - q_{19,0}) + Abs(q_{19,0} - q_{15,0}),$$

$$dq0L23 = Abs(q_{23,0} - 2*q_{22,0} + q_{21,0}) + Abs(q_{20,0} - 2*q_{19,0} + q_{18,0}) + Abs(q_{17,0} - q_{16,0} - q_{15,0} + q_{14,0}),$$

$$sq3L23 = Abs(q_{23,3} - q_{19,3}) + Abs(q_{19,3} - q_{15,3}),$$

$$dq3L23 = Abs(q_{23,3} - 2*q_{22,3} + q_{21,3}) + Abs(q_{20,3} - 2*q_{19,3} + q_{18,3}) + Abs(q_{17,3} - q_{16,3} - q_{15,3} + q_{14,3}),$$

wherein P represents the current block and $p_{i,j}$ represent samples in P, Q represents the adjacent block and $q_{i,j}$ represent samples in Q, thr1 is a first threshold, thr2 is a second threshold.

B14. The method of embodiment B11, wherein the condition comprises sp0L31+sq0L31<thr1, dp0L31+dq0L31<thr2, sp3L31+sq3L31<thr1, and dp3L31+dq3L31<thr2;

where:

$$sp0L31 = Abs(p_{31,0} - p_{27,0}) + Abs(p_{27,0} - p_{23,0}),$$

$$dp0L31 = Abs(p31,0 - 2*p30,0 + p29,0) + Abs(p28,0 - 2*p27,0 + p26,0) + Abs(p25,0 - p24,0 - p23,0 + p22,0),$$

$$sp3L31 = Abs(p_{31,3} - p_{27,3}) + Abs(p_{27,3} - p_{23,3}),$$

$$dp3L31 = Abs(p_{31,3} - 2*p_{30,3} + p_{29,3}) + Abs(p_{28,3} - 2*p_{27,3} + p_{26,3}) + Abs(p_{25,3} - p_{24,3} - p_{23,3} + p_{22,3}),$$

$$sq0L31 = Abs(q_{31,0} - q_{27,0}) + Abs(q_{27,0} - q_{23,0}),$$

$$dq0L31 = Abs(q_{31,0} - 2*q_{30,0} + q_{29,0}) + Abs(q_{28,0} - 2*q_{27,0} + q_{26,0}) + Abs(q_{25,0} - q_{24,0} - q_{23,0} + q_{22,0}),$$

$$sq3L31 = Abs(q_{31,3} - q_{27,3}) + Abs(q_{27,3} - q_{23,3}),$$

$$dq3L31 = Abs(931,3 - 2*q_{30,3} + q_{29,3}) + Abs(q_{28,3} - 2*q_{27,3} + q_{26,3}) + Abs(q_{25,3} - q_{24,3} - q_{23,3} + q_{22,3}),$$

wherein P represents the current block and $p_{i,j}$ represent samples in P, Q represents the adjacent block and $q_{i,j}$ represent samples in Q, thr1 is a first threshold, thr2 is a second threshold.

C1. A computer program comprising instructions which when executed by processing circuitry of a node, causes the node to perform the method of any one of embodiments A1-A15, and B1-B14.

C2. A carrier containing the computer program of embodiment C1, wherein the carrier is one of an electronic signal, an optical signal, a radio signal, and a computer readable storage medium.

D1. An encoder, the encoder comprising:
processing circuitry; and
a memory, the memory containing instructions executable by the processing circuitry, whereby the encoder is configured to perform the method of any one the embodiments A1-A15, and B1-B14.

D2. A decoder, the decoder comprising:
processing circuitry; and
a memory, the memory containing instructions executable by the processing circuitry, whereby the decoder is configured to perform the method of any one the embodiments A1-A14, and B1-B14.

E1. An encoder configured to deblock, the encoder being further configured to:
check whether a current block is smooth;
check whether an adjacent block is smooth, wherein the adjacent block is adjacent to a boundary of the current block;
determine that a criteria is true, wherein the criteria comprises one or more of the current block and the adjacent block being smooth; and
as a result of determining that the criteria is true, apply a long-tap deblocking across the boundary of the current block, wherein a length of the long-tap deblocking is greater than 7

E2. The encoder of embodiment E1, wherein the encoder is further configured to perform the method of any one of embodiments A2-A15.

F1. An encoder configured to deblock, the encoder being further configured to:
check whether a size of a current block exceeds a size threshold;
check whether a size of an adjacent block exceeds the size threshold, wherein the adjacent block is adjacent to a boundary of the current block;

determine that a criteria is true, wherein the criteria comprises both a size of the current block and a size of the adjacent block exceeding the size threshold; and as a result of determining that the criteria is true, apply a long-tap deblocking across the boundary of the current block, wherein a length of the long-tap deblocking is greater than 7.

F2. The encoder of embodiment F1, wherein the encoder is further configured to perform the method of any one of embodiments B2-B14.

G1. A decoder configured to deblock, the decoder being further configured to:
check whether a current block is smooth;
check whether an adjacent block is smooth, wherein the adjacent block is adjacent to a boundary of the current block;
determine that a criteria is true, wherein the criteria comprises one or more of the current block and the adjacent block being smooth; and
as a result of determining that the criteria is true, apply a long-tap deblocking across the boundary of the current block, wherein a length of the long-tap deblocking is greater than 7.

G2. The decoder of embodiment G1, wherein the decoder is further configured to perform the method of any one of embodiments B2-B13.

H1. A decoder configured to deblock, the decoder being further configured to:
check whether a size of a current block exceeds a size threshold;
check whether a size of an adjacent block exceeds the size threshold, wherein the adjacent block is adjacent to a boundary of the current block;
determine that a criteria is true, wherein the criteria comprises both a size of the current block and a size of the adjacent block exceeding the size threshold; and
as a result of determining that the criteria is true, apply a long-tap deblocking across the boundary of the current block, wherein a length of the long-tap deblocking is greater than 7.

H2. The decoder of embodiment H1, wherein the decoder is further configured to perform the method of any one of embodiments B2-B14.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for deblocking, the method comprising:
checking whether a size of a current block exceeds a size threshold;
checking whether a size of an adjacent block exceeds the size threshold, wherein the adjacent block is adjacent to a boundary of the current block;
determining that a criteria is true, wherein the criteria comprises both a size of the current block and a size of the adjacent block exceeding the size threshold; and
as a result of determining that the criteria is true, applying a long-tap deblocking across the boundary of the current block, wherein a length of the long-tap deblocking is greater than 7.

2. The method of claim 1, wherein the boundary of the current block comprises a vertical block boundary and the block adjacent to the boundary of the current block comprises a block to the left of the current block, and wherein the size threshold includes a width component.

3. The method of claim 1, wherein the boundary of the current block comprises a horizontal block boundary and the block adjacent to the boundary of the current block comprises a block above the current block, and wherein the size threshold includes a height component.

4. The method of claim 1, wherein the size threshold includes both a height component and a width component.

5. The method of claim 1, wherein a length of the long-tap deblocking is based on the size threshold.

6. The method of claim 5, wherein the size threshold is 64×64 and the length of the long-tap deblocking is 15.

7. The method of claim 5, wherein the size threshold is 128x128 and the length of the long-tap deblocking is 31.

8. The method of claim 5, wherein the size threshold is 256×256 and the length of the long-tap deblocking is 31.

9. The method of claim 1, further comprising, prior to applying a long-tap deblocking across the boundary of the current block, determining that a measure of a line of samples in the current block is below a threshold.

10. The method of claim 9, wherein the measure of samples in the current block is calculated as the absolute value of the sum $\Sigma i[p(i)*mlt(i)]$, where the sum is over the line of samples in the current block, p(i) refers to the respective samples, and mlt(i) is +1 for the first and last (N+1)/4 samples and −1 otherwise, where N is the number of the samples.

11. The method of claim 1, wherein applying a long-tap deblocking across the boundary of the current block comprises checking a condition on both sides of the boundary of the current block and setting a length of the long-tap deblocking based on the checking the condition on both sides of the boundary of the current block.

12. The method of claim 11, wherein the condition comprises sp0L15+sqOL15 <thr1, dpOL15+dqOL15<thr2, sp3L15+sq3L15<thr1, and dp3L15+dq3L15<thr2;
where:

$$sp0L15 = \text{Abs}(p_{15,0} - p_{11,0}) + \text{Abs}(p_{11,0} - p_{7,0}),$$

$$dp0L15 = \text{Abs}(p_{15,0} - 2*p_{14,0} + p_{13,0}) + \text{Abs}(p_{12,0} - 2*p_{11,0} + p_{10,0}) + \text{Abs}(p_{9,0} - p_{8,0} - p_{7,0} + p_{6,0}),$$

$$sp3L15 = \text{Abs}(p_{15,3} - p_{11,3}) + \text{Abs}(p_{11,3} - p_{7,3}),$$

$$dp3L15 = \text{Abs}(p_{15,3} - 2*p_{14,3} + p_{13,3}) + \text{Abs}(p_{12,3} - 2*p_{11,3} + p_{10,3}) + \text{Abs}(p_{9,3} - p_{8,3} - p_{7,3} + p_{6,3}),$$

$$sq0L15 = \text{Abs}(q_{15,0} - q_{11,0}) + \text{Abs}(q_{11,0} - q_{7,0}),$$

$$dq0L15 = \text{Abs}(q_{15,0} - 2*q_{14,0} + q_{13,0}) + \text{Abs}(q_{12,0} - 2*q_{11,0} + q_{10,0}) + \text{Abs}(q_{9,0} - q_{8,0} - q_{7,0} + q_{6,0}),$$

$$sq3L15 = \text{Abs}(q_{15,3} - q_{11,3}) + \text{Abs}(q_{11,3} - q_{7,3}), \text{ and}$$

$$dq3L15 = \text{Abs}(q_{15,3} - 2*q_{14,3} + q_{13,3}) + \text{Abs}(q_{12,3} - 2*q_{11,3} + q_{10,3}) + \text{Abs}(q_{9,3} - q_{8,3} - q_{7,3} + q_{6,3}),$$

wherein P represents the current block (404) and $p_{i,j}$ represent samples in P, Q represents the adjacent block (406) and $q_{i,j}$ represent samples in Q, thr1 is a first threshold, thr2 is a second threshold.

13. The method of claim 11, wherein the condition comprises spOL23+sqOL23<thr1, dp0L23+dq0L23<thr2, sp3L23+sq3L23<thr1, and dp3L23+dq3L23<thr2; where:

$$spOL23=\text{Abs}(p_{23,0}-p_{19,0})+\text{Abs}(p_{19,0}-p_{15,0}),$$

$$dp0L23=\text{Abs}(p_{23,0}-2*p_{22,0}+p_{21,0})+\text{Abs}(p_{20,0}-2*p_{19,0}+p_{18,0})+\text{Abs}(p_{17,0}-p_{16,0}-p_{15,0}+p_{14,0}),$$

$$sp3L23=\text{Abs}(p_{23,3}-p_{19,3})+\text{Abs}(p_{19,3}-p_{15,3}),$$

$$dp3L23=\text{Abs}(p_{23,3}-2*p_{22,3}+p_{21,3})+\text{Abs}(p_{20,3}-2*p_{19,3}+p_{18,3})+\text{Abs}(p_{17,3}-p_{16,3}-p_{15,3}+p_{14,3}),$$

$$sq0L23=\text{Abs}(q_{23,0}-q_{19,0})+\text{Abs}(q_{19,0}-q_{15,0}),$$

$$dq0L23=\text{Abs}(q_{23,0}-2*q_{22,0}+q_{21,0})+\text{Abs}(q_{20,0}-2*q_{19,0}+q_{18,0})+\text{Abs}(q_{17,0}-q_{16,0}-q_{15,0}+q_{14,0}),$$

$$sq3L23=\text{Abs}(q_{23,3}-q_{19,3})+\text{Abs}(q_{19,3}-q_{15,3}),$$

$$dq3L23=\text{Abs}(q_{23,3}-2*q_{22,3}+q_{21,3})+\text{Abs}(q_{20,3}-2*q_{19,3}+q_{18,3})+\text{Abs}(q_{17,3}-q_{16,3}-q_{15,3}+q_{14,3}),$$

wherein P represents the current block and $p_{i,j}$ represent samples in P, Q represents the adjacent block and $q_{i,j}$ represent samples in Q, thr1 is a first threshold, thr2 is a second threshold.

14. The method of claim 11, wherein the condition comprises spOL31+sqOL31<thr1, dp0L31+dq0L31<thr2, sp3L31+sq3L31<thr1, and dp3L31+dq3L31<thr2; where:

$$sp0L31=\text{Abs}(p_{31,0}-p_{27,0})+\text{Abs}(p_{27,0}-p_{23,0}),$$

$$dp0L31=\text{Abs}(p_{31,0}-2*p_{30,0}+p_{29,0})+\text{Abs}(p_{28,0}-2*p_{27,0}+p_{26,0})+\text{Abs}(p_{25,0}-p_{24,0}-p_{23,0}+p_{22,0}),$$

$$sp3L31=\text{Abs}(p_{31,3}-p_{27,3})+\text{Abs}(p_{27,3}-p_{23,3}),$$

$$dp3L31=\text{Abs}(p_{31,3}-2*p_{30,3}+p_{29,3})+\text{Abs}(p_{28,3}-2*p_{27,3}+p_{26,3})+\text{Abs}(p_{25,3}-p_{24,3}-p_{23,3}+p_{22,3}),$$

$$sq0L31=\text{Abs}(q_{31,0}-q_{27,0})+\text{Abs}(q_{27,0}-q_{23,0}),$$

$$dq0L31=\text{Abs}(q_{31,0}-2*q_{30,0}+q_{29,0})+\text{Abs}(q_{28,0}-2*q_{27,0}+q_{26,0})+\text{Abs}(q_{25,0}-q_{24,0}-q_{23,0}+q_{22,0}),$$

$$sq3L31=\text{Abs}(q_{31,3}-q_{27,3})+\text{Abs}(q_{27,3}-q_{23,3}),$$

$$dq3L31=\text{Abs}(q_{31,3}-2*q_{30,3}+q_{29,3})+\text{Abs}(q_{28,3}-2*q_{27,3}+q_{26,3})+\text{Abs}(q_{25,3}-q_{24,3}-q_{23,3}+q_{22,3}),$$

wherein P represents the current block and $p_{i,j}$ represent samples in P, Q represents the adjacent block and $q_{i,j}$ represent samples in Q, thr1 is a first threshold, thr2 is a second threshold.

15. An encoder configured to deblock, the encoder being comprising:
a processor; and
a memory, the memory containing instructions executable by the processor, whereby the encoder is configured to:
check whether a size of a current block exceeds a size threshold;
check whether a size of an adjacent block exceeds the size threshold, wherein the adjacent block is adjacent to a boundary of the current block;
determine that a criteria is true, wherein the criteria comprises both a size of the current block and a size of the adjacent block exceeding the size threshold; and
as a result of determining that the criteria is true, apply a long-tap deblocking across the boundary of the current block, wherein a length of the long-tap deblocking is greater than 7.

16. The encoder of claim 15, wherein the boundary of the current block comprises (i) a vertical block boundary and the block adjacent to the boundary of the current block comprises a block to the left of the current block, and wherein the size threshold includes a width component, and or (ii) a horizontal block boundary and the block adjacent to the boundary of the current block comprises a block above the current block, and wherein the size threshold includes a height component.

17. The encoder of claim 15, wherein a length of the long-tap deblocking is based on the size threshold.

18. A decoder configured to deblock, the decoder comprising:
a processor; and
a memory, the memory containing instructions executable by the processor, whereby the decoder is configured to:
check whether a size of a current block exceeds a size threshold;
check whether a size of an adjacent block exceeds the size threshold, wherein the adjacent block is adjacent to a boundary of the current block;
determine that a criteria is true, wherein the criteria comprises both a size of the current block and a size of the adjacent block exceeding the size threshold; and
as a result of determining that the criteria is true, apply a long-tap deblocking across the boundary of the current block, wherein a length of the long-tap deblocking is greater than 7.

19. The decoder of claim 18, wherein the boundary of the current block comprises (i) a vertical block boundary and the block adjacent to the boundary of the current block comprises a block to the left of the current block, and wherein the size threshold includes a width component, and or (ii) a horizontal block boundary and the block adjacent to the boundary of the current block comprises a block above the current block, and wherein the size threshold includes a height component.

20. The decoder of claim 19, wherein a length of the long-tap deblocking is based on the size threshold.

* * * * *